United States Patent [19]
Motomura

[11] Patent Number: 5,815,727
[45] Date of Patent: Sep. 29, 1998

[54] PARALLEL PROCESSOR FOR EXECUTING PLURAL THREAD PROGRAM IN PARALLEL USING VIRTUAL THREAD NUMBERS

[75] Inventor: Masato Motomura, Tokyo, Japan

[73] Assignee: NEC Corporation, Tokyo, Japan

[21] Appl. No.: 575,860

[22] Filed: Dec. 20, 1995

[30] Foreign Application Priority Data

Dec. 20, 1994 [JP] Japan ................................. 6-317162
Mar. 1, 1995 [JP] Japan ................................. 7-041538

[51] Int. Cl.$^6$ ................................................. G06F 12/00
[52] U.S. Cl. ................... 395/800.01; 395/468; 395/477; 395/726; 364/DIG. 1
[58] Field of Search .............................. 395/800, 800.01, 395/468, 477, 726; 364/DIG. 1

[56] References Cited

U.S. PATENT DOCUMENTS

| | | | |
|---|---|---|---|
| 5,430,850 | 7/1995 | Papadopoulos et al. | 395/375 |
| 5,524,247 | 6/1996 | Mizumo | 395/726 |
| 5,553,305 | 9/1996 | Gregor et al. | 395/800 |
| 5,560,029 | 9/1996 | Papadopoulos et al. | 395/800 |
| 5,590,326 | 12/1996 | Manabe | 395/477 |

OTHER PUBLICATIONS

B. Lee et al., "Dataflow Architectures and multithreading", Computer, IEEE Computer Society, vol. 27, No. 8, Aug. 1994, pp. 27–39.

R. Nikhil, "Cid: A Parallel, Shared–memory C for Distributed–memory Machines", Proceedings of 7th Annual Workshop on Languages and Compliers for Parallel Computing, Apr. 1994, pp. 1–15.

Primary Examiner—Alyssa H. Bowler
Assistant Examiner—Dzung C. Nguyen
Attorney, Agent, or Firm—Foley & Lardner

[57] ABSTRACT

A parallel processor system executing a program consisted of a plurality of threads in parallel per threads, includes thread generating portion for managing three states of executing state, executable state and waiting state as states of the threads and generating other thread in the executable state by fork operation from the threads in the executing state on predetermined processor, thread execution control portion for making the first thread in the executable state to be executed on the processor, providing guarantee for data dependency between a plurality of first threads in the executing states on the processors, executing a second thread in the executable state in place of the first threads when the first thread in the executing state enters into waiting state with interrupting execution, and re-executing the first thread in the waiting state after termination of execution of the second thread. The thread generating portion determines on sequential execution path and defining virtual thread number of threads as order of termination of threads in sequential execution of the program. The thread execution control portion controls execution of the threads so as to all of synchronization operation in the program being performed only in the direction from the thread having smaller virtual thread number to the thread having greater virtual thread number.

29 Claims, 14 Drawing Sheets

| THREAD IN THE EXECUTABLE STATE | THREAD IN THE WAITING STATE | THREAD UNDER EXECUTION |
|---|---|---|
| 3 , 2 | — | 4 |
| 2 | 4 | 3 |
| — | 4 , 3 | 2 |
| — | 4 | 3 |
| — | — | 4 |

FIG. 12
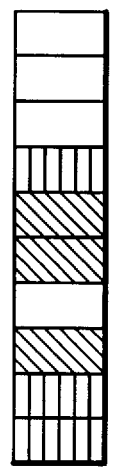
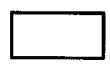 THREAD DESCRIPTER SLOT NOT CONTAINING THREAD DESCRIPTER
 THREAD DESCRIPTER INCLUDING THREAD DESCRIPTER IN WAITING STATE
 THREAD DESCRIPTER INCLUDING THREAD DESCRIPTER IN EXECUTABLE STATE

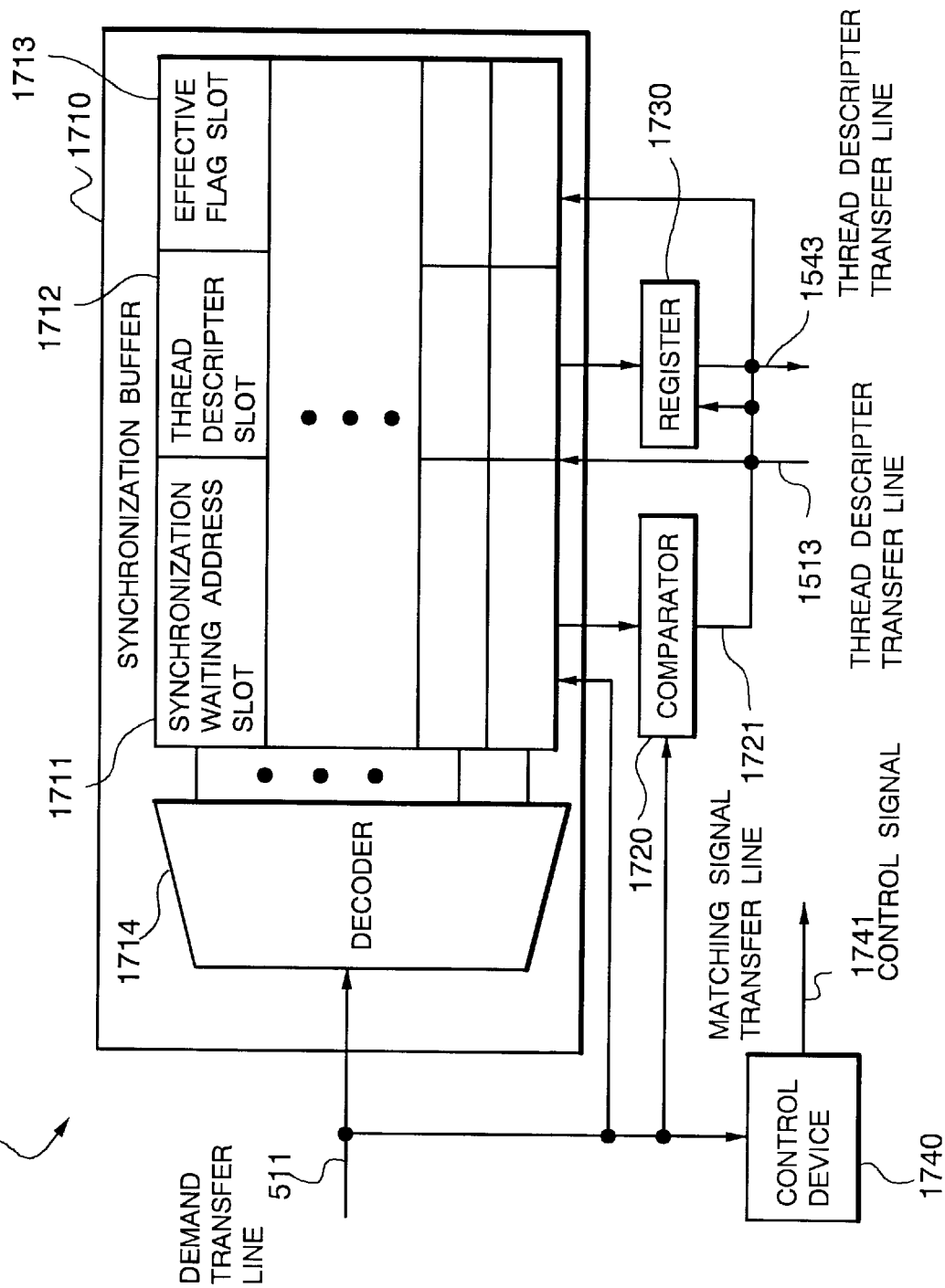

PARALLEL PROCESSOR FOR EXECUTING PLURAL THREAD PROGRAM IN PARALLEL USING VIRTUAL THREAD NUMBERS

BACKGROUND OF THE INVENTION

1. Field of the Invention

The present invention relates to a processor system executing a computer program. More specifically, the invention relates to a parallel processor system performing parallel process of one program on a plurality of processors.

2. Description of the Related Art

In a parallel processor system constituted by a plurality of processors, a multithread executing method is known for executing parallel process of a multithreaded program. Such a method is used for parallel execution of programs realizing higher performance by executing program in parallel.

In this type of multithread execution method, one program is divided into a plurality of parallel executable threads by fork operations. In the manner dependency of data between threads executed in parallel is guaranteed. Such programs will be hereinafter referred to as multithreaded program.

The multithreaded programs is executed in parallel per threads on a plurality of processors. The executing condition of the threads at least includes an executing state, an execution enabled state and a waiting state. A thread which is forked from a thread in the executing state on certain processor and has not yet initiated exection on another arbitrary processor is referred to as a thread in the execution enabled state.

An important feature of the multithread execution method is that when a certain thread enters into a waiting state on one processor, another thread is executed in its place. Here, the reason for entry into the waiting state is to read data in the memory in another processor or because of a failure of synchronizing operations. The thread retrieved from the waiting state is again executed on the same processor. Such thread in the waiting state is fixed the processor to be executed. Therefore, such thread is referred to as waiting state thread on the processor. Here, individual threads are associated on a one-to-one basis a memory region called as activation record in. The activation record is a region for storing local parameters used by the thread, arguments received from other thread, argument to be fed to other threads and so forth. The activation record is reserved upon initiation of the thread and released upon termination of the thread.

A conventional multithread execution method, is disclosed on Bee Lee and A. R. Hurson, "Dataflow Architectures and Multithreading", Computer, Vol. 27, No. 8, pages 27–39, August, 1994, IEEE Computer Society. Similar technology has been disclosed in Rishiyui S. Nikhil, "Cid: A Parallel. Shared-memory C for Distributed-memory Machines", Proceedings of 7th Annual Workshop on Languages and Compliers for Parallel Computing, Ithaca, N.Y. Springer-Verlag.

On the other hand, in general, when one program is executed sequentially without dividing, an activation record is given for each function of the program. In such a case, management of the activation record can be done by using a stack. Namely, the thread performs addition of the stack pointer at the initial stage of execution of each function to reserve the memory region for the own activation record. On the other hand, at the final portion of the procedure, the thread subtract the stack pointer to release the reserved memory region. In such sequential execution, reservation and release of the activation record is quite simple by utilizing the stack, and can be described in the code of the function (called as "inline stack management"). The reason why the management of the activation record upon sequential execution is simple, is that the order of LIFO (Last In Fast Out), in which last initiated function is always terminated first, is constantly maintained.

In contrast to this, in the conventional multithread execution method, the order of reserving the activation record and the order of releasing the same are normally not determined. This is because the order of starting the thread and the order of terminating the thread are not associated. Therefore, reservation and releasing of the activation record cannot be managed by the stack and has to be managed by employing a more complicated data structure. For such memory management, heap is typically employed, memory management by the heap has greater load than that of the stack, and cannot be directly buried in the code as in the case where the stack is used, to require a process calling dedicated library. For example, in case of the memory management buried in the code by the stack, management can be done in the order of two or three instructions. In contrast to this, when the memory management library is called by the heap, several tens instructions are required.

Such conventional multithread execution method holds a problem of excessively high management cost of the activation record.

On the other hand, in the conventional multithread execution method, resumption of execution of the thread in the waiting stage is triggered by release of the factors causing the waiting state. In such execution method, it becomes necessary to provide means for checking whether the cause of the waiting state has been resolved or not and means for initiating execution of the thread in the waiting state based on the result of checking. In general, complicate hardware becomes necessary to realize such means. cl SUMMARY OF THE INVENTION It is an object of the present invention to provide a parallel processor system which has lesser overhead in execution and can realize efficient multithread execution method.

According to one aspect of the invention, a parallel processor system executing a program consisted of a plurality of threads in parallel per threads, comprises:

thread generating means for managing three states of executing state, executable state and waiting state as states of the threads and generating other thread in the executable state by fork operation from the threads in the executing state on predetermined processor;

thread execution control means for making the first thread in the executable state to be executed on the processor, providing guarantee for data dependency between a plurality of first threads in the executing states on the processors, executing a second thread in the executable state in place of the first threads when the first thread in the executing state enters into waiting state with interrupting execution, and re-executing the first thread in the waiting state after termination of execution of the second thread;

the thread generating means determining on sequential execution path and defining virtual thread number of threads as order of termination of threads in sequential execution of the program; and the thread execution control means controlling execution of the threads so as to all of syhronization operiation in the program being performed only in the direction from the thread having smaller virtual thread number to the thread having greater virtual thread number.

The thread generating means may obtain the sequential execution oath with respect to the program by replacing all of the fork operation with sequential functiol call operation.

The thread exection control means may control order of execution of the threads on the processor so that, with respect to one processor, the virtual thread number of the thread in the executing state is smaller than the virtual thread number of all of the thread in the waiting state on the same processor.

The thread generating means may manage activation record region to be used by the thread by employing a stack.

According to another apsect of the invention, a parallel rpocessor system executing a program consisted of a plurality of threads in parallel per threads, comprises:

thread descripter storage means common between a plurality of processors for arranging a plurality of thread descripter slots in alignment and storing thread descripters holding information necessary for execution of the threads in the thread descripter slots;

the thread descripter storage means storing thread descripter of threads in the executable state or the thread descripter of the threads in the waiting state in the thread descripter slots, and holds a plurality of thread descripters stored in the plurality of thread descripter slots in linear order depending upon large and small relationship of virtual thread numbers corresponding to respective threads.

The threads in the executing state in processors further may include a thread descripter pointer managing means corresponding to a plurality of processors for storing thread descripter pointers indicative of corresponding thread descripter slot positions in the thread descripter storage means in the linear order by the virtual thread number.

The thread descripter storage means may insert the thread descripter corresponding to new thread in the executable state to the thread descripter slot designated by the value of the thread descripter pointer upon form operation of the thread in the executing state on the predetermined processor.

The thread descripter storage means may define a plurality of thread descripters in the executable state as feedable among a plurality of thread descripters stored in the plurality of thread descripter slots storing thread descripter having smaller thread numbers than the thread descripter designated by the thread descripter pointer corresponding to the predetermined processor upon the thread executed in the predetermined processor enters into the waiting state, selects one of the feedable thread descripter and feeds the thread descripter to the processor, and The thread descripter of the thread in the waiting state may be inserted in the thread descripter slot designated employing the value of the thread descripter pointer.

The thread descripter storage means may define a plurality of thread descripters in the executable state as feedable among a plurality of thread descripters stored in the plurality of thread descripter slots storing thread descripter having smaller thread numbers than the thread descripter designated by the thread descripter pointer corresponding to the predetermined processor upon the thread executed in the predetermined processor is terminated, selects one of the feedable thread descripter and feeds the thread descripter to the processor.

When the thread executed on the predetermined processor enters in the waiting state, the thread descripter storage means may select the feedable thread having the corresponding virtual threads number smallest among a plurality of feedable thread descripters upon feeding of the thread descripter designating the thread to be next executed by the processor.

When the thread executed on the predetermined processor is terminated, the thread descripter storage means may select the feedable thread having the corresponding virtual threads number smallest among a plurality of feedable thread descripters upon feeding of the thread descripter designating line.

When said thread executed on the predetermined processor enters in the waiting state, said thread descripter storage means may select the feedable thread having the corresponding virtual threads number largest among a plurality of feedable thread descripters upon feeding of the thread descripter designating the thread to be next executed by the When said thread executed on the predetermined processor enters in the waiting state, said thread descripter storage means may select the feedable thread having the corresponding virtual threads number largest among a plurality of feedable thread descripters upon feeding of the thread descripter designating the thread to be next executed by the processor.

When said thread executed on the predetermined processor enters in the waiting state, said thread descripter storage means may select the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters.

When said thread executed on the predetermined processor enters in the waiting state, said thread descripter storage means may select the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters.

When said thread executed on the predetermined processor enters in the waiting state, said thread descripter storage means may select the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters, and otherwise select the thread descripter corresponding the largest virtual thread number.

The thread executed on the predetermined processor may be terminated, the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters, and otherwise select the thread descripter corresponding the largest virtual thread number.

The thread descripter storage means may compare number of thread descripter with respect to the stored threads in the waiting state and number of thread descripters with respect to the threads in the executable state and dynamically determines which thread descripter is to be selected among a plurality of feedable thread descripters depending upon comparison, when said thread executed on the predetermined processor enters in the waiting state and upon feeding of the thread descripter designating the thread to be next executed by the processor.

The thread descripter storage means may compare number of thread descripter with respect to the stored threads in the waiting state and number of thread descripters with respect to the threads in the executable state and dynamically determines which thread descripter is to be selected among a plurality of feedable thread descripters depending upon comparison, when said thread executed on the predetermined processor terminated and upon feeding of the thread descripter designating the The thread descripter storage means may compare number of thread descripter with respect to the stored threads in the waiting state and number of thread descripters with respect to the threads in the executable state so that the thread descripter corresponding to the smallest virtual thread number is selected when the number of the thread descripter with respect to the threads in waiting state is greater and the thread descripter corresponding to the largest virtual thread number is selected when the number of the thread descripter with respect to the threads in executable state is greater, when said thread executed on the predetermined processor enters in the waiting state and upon feeding of the thread descripter designating the thread to be next executed by the processor.

The thread descripter storage means may compare number of thread descripter with respect to the stored threads in the waiting state and number of thread descripters with respect to the threads in the executable state so that the thread descripter corresponding to the smallest virtual thread number is selected when the number of the thread descripter with respect to the threads in waiting state is greater and the thread descripter corresponding to the largest virtual thread number is selected when the number of the thread descripter with respect to the threads in executable state is greater, when said thread executed on the predetermined processor terminated and upon feeding of the thread descripter designating the thread to be next executed by the processor.

The thread descripter pointer managing means may store an inter-processor order relationship information indicative of the order relationship based on relative large and small relationship of the virtual thread number between a plurality of threads in the executing state ion the processors, with respect to a plurality of processors, and when the thread descripter pointers relating to a plurality of processors are designated to the same thread descripter thread, the order relationship based on the virtual thread number between said plurality of threads in executing state on said processors may be judged employing said inter-processor order relationship information.

The thread descripter pointer managing means may reject fork demand when number of thread descripters beyond the number of the thread descripter slots are generated by the fork operation of the processors.

The thread descripter storage means may include a feedback flag slots adding condition whether the thread descripter stored associated with the thread descripter slots are feedable or not, and said thread descripter storage means makes judgement that a plurality of the thread descripters in the executable state being feedable among a plurality the thread descripters stored in said plurality of thread descripter slots storing thread descripter smaller than the virtual thread numbers than the thread descripter slot designated by the thread descripter pointer corresponding to the processor when the thread executed on said processor falls into the waiting state, and makes judgement that a plurality of the thread descripters in the executable state being feedable among a plurality the thread descripters stored in said plurality of thread descripter slots storing thread descripter smaller than the virtual thread numbers than the thread descripter slot designated by the thread descripter pointer corresponding to the processor when the thread executed on said processor is terminated, and limits only thread descripters stored in the thread descripter slots, on which said feedable flag is set, as feedable for selecting one of a plurality of thread descripters defined as feedable to The parallel processing system may further comprise feedable flag setting means for setting feedable flag for the feedable flag slot corresponding to the thread descripter forked at the earliest timing among the thread descripters in the executable state stored in said thread descripter storage means formed from one thread.

The feedable flag setting means may store thread switching flag corresponding to a plurality of processor, which thread switching flag is set only when thread in the executing state on the processor does not fork thread after initiation of execution.

The parallel processor system may further comprise a feeding flag setting means for setting feedable flag for the feedable flag slots corresponding to thread descripters in synchronization is established among the thread descripters in the waiting state stored in said thread descripter storage means.

The feedable flag setting means may include a synchronization buffer for storing the thread descripter in the waiting state on which synchronization is not established and a synchronization waiting address corresponding to the thread descripter in the waiting state, and said synchronization waiting address stored in said synchronization buffer is employed for inspection whether synchronization is established or not for the thread descripter in the waiting state for synchronized writing.

Among the limited feedable thread descripter, the thread descripter of the maximum or minimum virtual address number may be fed.

Other objects, features and advantages of the present invention will become apparent from the detailed discussion given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 12 is an illustration showing an operation for selecting one of a plurality of thread descripter which can be transmitted in the shown embodiment of the ordered multithread execution system;

FIG. 17 is a block diagram showing a constriction of a waiting state thread descripter transmission enabling system in the fourth embodiment of the parallel processor system.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
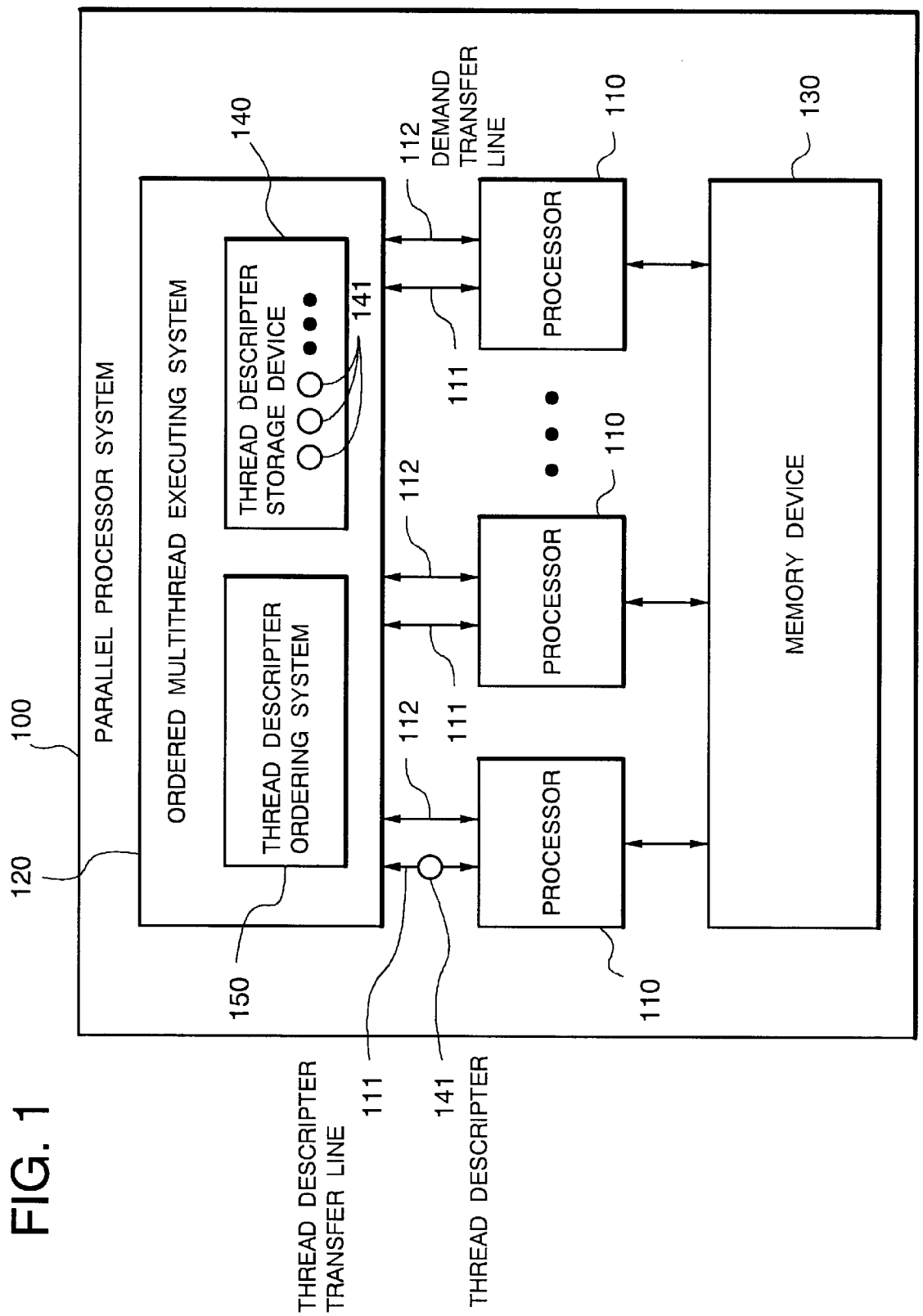
FIG. 1 is a block diagram showing a construction of the first embodiment of a parallel processor system according to the present invention.

FIG. 1 is a block diagram showing a construction of the first embodiment of a parallel processor system realizing a multithread executing method according to the present invention.

As shown in FIG. 1, the shown embodiment of a parallel processor system 100 includes an arbitrary number of processors 110, an ordered multithread executing system 120 common to the processors, and a memory device 130 connected to the processors 110. The memory device may be common to respective processors 110 as shown, or, in the alternative, may be provided independently for respective processors. Also, in FIG. 1, only particular elements of the shown embodiment have been illustrated and other less important and known elements are not illustration for maintaining the disclosure simple enough to facilitate clear understanding of the invention.

The ordered multithread execution system 120 has a thread descripter storage device 140 and a thread descripter ordering system 150. The ordered multithread executing system 120 and respective processor 110 are bidirectionally connected through thread descripter transfer lines 111 and demand transfer lines 112. When the processor 110 forks other threads during execution of a certain thread, a fork demand is transferred to the ordered multithread executing system 120 via the demand transfer line 112. Also, a thread descripter 141 is fed to the ordered multithread executing system 120 via the thread descripter transfer line 111. The thread descripter 141 of the transferred thread in the executable state is stored in the thread descripter storage device 140 according to the command of a thread descripter ordering system 150. When one processor 110 initiates execution of a new thread, the processor 110 request the thread descripter 141 of the new executable thread from the ordered multithread executing system 120 via the demand transfer line 112. In response to the request, according to instructions from the thread descripter ordering system 150, the thread descripter 141 is read out from an appropriate position of the thread descripter storage device 140 and transferred to the processor via the thread descripter transfer line 111. Here, the thread descripter 141 is written information necessary for initiating execution of a certain thread and is generally consisted a start instruction address of the thread, an argument to be used in the thread and a pointer to the argument.

In FIG. 1, when a certain thread on the processor 110 enters into a waiting state, the processor 110 require a new thread in the executable state from the ordered multithread executing system 120 and initiates execution of the new thread depending upon the received thread descripter 141, in the manner set forth above. When a certain thread is completed, the processor 110 require a new thread in the executable state to the ordered multithread executing system 120 and initiates execution of the new thread depending upon the received thread descripter 141, in the manner set forth above, or re-executes a thread in the waiting state on the processor 110.

Figure 2:
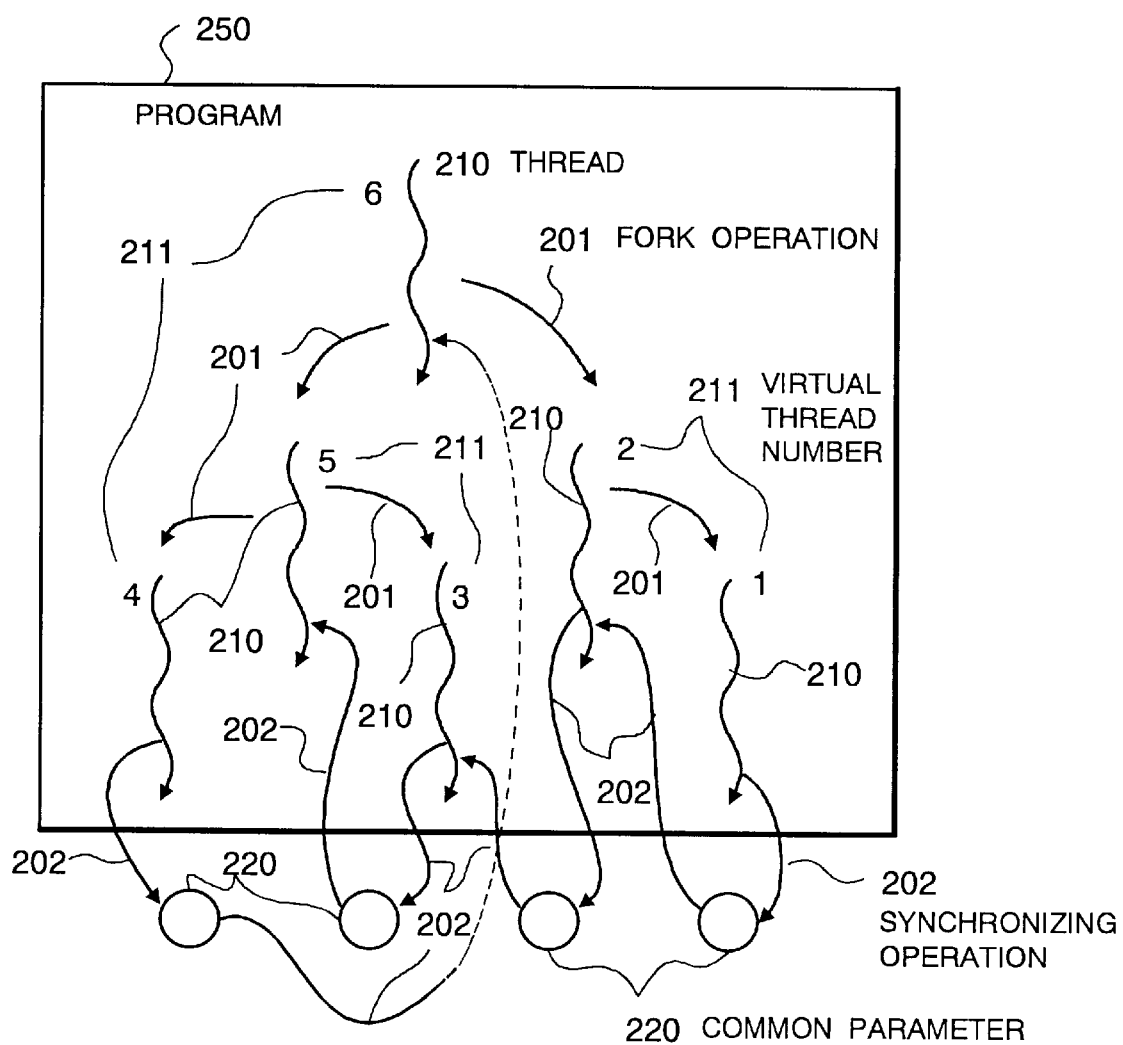
FIG. 2 is an illustration showing an example of a program multithreaded in the shown embodiment.

FIG. 2 is an explanatory illustration showing an example of a multithreaded program to be executed by the shown embodiment of the parallel processor system 100, in which is diagrammatically shown a simple example of the program structure in the shown embodiment. In FIG. 2, one program 250 consists of a plurality of threads 210 and generation of the thread is performed by fork operations 201. Between a plurality of threads, a common parameter 220 is common thereto. Synchronization 202 is performed on the common parameter 220. a synchronizing operation 202 toward the common parameter 220 represents a synchronized writing to the common parameter 220 and a synchronizing operation from the common parameter 220 is synchronized reading. When the synchronized writing is performed before synchronized reading, synchronization is successful and otherwise synchronization is fails.

In the shown embodiment, at first, with respect to the multithreaded single program, one sequential execution path is defined. Then, as an order of a termination of thread in sequential execution of the program 250, a virtual thread number is defined. Also, concerning the virtual thread number defined as set forth above, the program 250 is constructed so that all of the synchronizing operations 202 present in the program 250 are always performed from the thread having the smaller thread number to the thread having the greater thread number. It is the first feature of the shown embodiment to construct the program 250 by defining the sequential execution path.

In order to obtain such sequential execution path, in FIG. 2, the sequential execution path is defined for the fork operation 201 of the thread 210. Along the sequential execution path, the order of termination of the threads is given by numbers of 1 to 6 per every thread 210. The number given in this manner is referred to as the virtual thread number 211. In other words, in the embodiment of FIG. 2, at a the time where the fork operation has occurred, execution of the thread 210 is interrupted and execution of the thread 210 in the fork destination is started. By repeating this operation, the sequential execution path is obtained. Establishing of the sequential execution path in the manner set forth above, is the second feature of the shown embodiment. In addition, as an embodiment of a method for obtaining the sequential execution path, there is a method to obtain the sequential execution path by executing the thread formed from one thread upon termination of execution of the one thread 210.

The program 250 illustrated in FIG. 2, is constructed to permit synchronizing operation 202 from the thread having smaller virtual thread number to the thread having the greater virtual thread number in accordance with a demand to the multithreaded program, as the first feature of the ordered multithread executing method of the present invention. By this, when the program is sequentially executed along the sequential execution path obtained by the sequential execution generating method in the present invention, the program does not cause failure of synchronization upon sequential execution thereof.

On the other hand, the thread which can be executed on an arbitrary processor, is selected so that the virtual thread numbers 211 of all of the threads 210 in the waiting state on the processor in question become smaller than the virtual thread number 211 of the thread under execution on that processor. This is the third feature of the shown embodiment. More concretely, in the embodiment illustrated in FIGS. 1 and 2, when thread 210 under execution on a certain processor enters into the waiting state, the processor 110 in question request a new thread 210 in the executable state to the ordered multithread executing system 120. Then, the ordered multithread executing system 120 selects one of a plurality of thread descripters 141 corresponding to the threads in the executable state and having the smallest virtual thread among all of the threads 210 in the waiting state on the processor 110 in question, and feeds out the corresponding selected thread descripter 141. When the thread under execution on a certain processor is terminated, the processor 110 in question request a new thread 210 in the executable state to the ordered multithread executing system 120. Then, the ordered multithread executing system 120 selects one of a plurality of thread descripters 141 corresponding to the threads in the executable state and having the smallest virtual thread numbers among all of the threads 210 in the waiting state on the processor 110 in question, and feeds out the corresponding selected thread descripter 141.

When there is no thread in the executable state, the processor 110 in question selects one of the threads in the waiting state thereon and having smallest virtual thread number for re-execution thereof. This is the third feature of the shown embodiment.

Figures 3, 4:
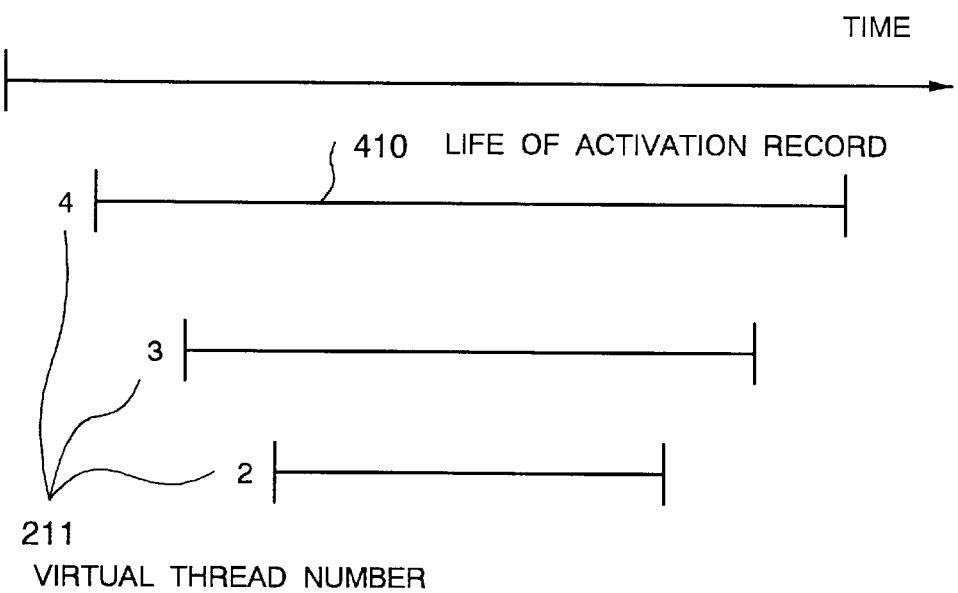
FIG. 3 is an illustration showing operation procedure of the multithread execution method in the shown embodiment.
FIG. 4 is a timing chart showing a lift period of an activation record accompanied with each thread of the shown embodiment.

FIG. 3 is an illustration showing a procedure for selecting the thread in the executable state. In this drawing, the state of respective threads 210 are varied from the state shown in the uppermost row to the state shown in the lower rows sequentially. The numbers used in FIG. 3 are virtual thread number 211. These virtual thread numbers 211 correspond to the example of the multithreaded program. On the other hand, in FIG. 3, a thread 210 in the waiting state and the thread 210 under execution represent threads in those states on the processor 110 in question.

In the uppermost row in FIG. 3, the virtual thread number 211 of the thread 210 in the executable state are 3 and 2, the thread 210 in the waiting state is not present and the virtual thread number 211 of the thread 210 under execution is 4. At this condition, assuming that the thread 210 having the virtual thread number 4 enters into the waiting state, either of two threads 210 in the executable state, both having smaller virtual thread numbers, may be selected. Here, it is assumed that the thread 210 having the virtual thread number 211 "3" is selected, as illustrated in the next row in FIG. 3.

When the virtual thread number 3 of the thread 210 also enters into the waiting state, the thread 210 in the executable state and having the virtual thread number 2 can be selected. Thus, as shown in the row 3 in FIG. 3, the processor 110 in question executes the thread 210 of the virtual thread number 2. At this condition, the threads in the waiting state becomes those of the virtual thread numbers 4 and 3.

Next, it is assumed that execution of the thread 210 of the virtual thread number 2 is completed. In this case, as set forth above, the processor 110 requires feeding of the thread descripter 141 of the new thread in the executable state to the ordered multithread executing system 120 or re-executes the thread 210 in the waiting state. Here, since no executable thread is present, one of the threads in the waiting state is re-executed. Upon re-execution, the thread 210 having the smallest virtual thread number 211 is selected. In the shown example, the thread 210 to be selected in the thread of the virtual thread number 3. When execution of the selected thread of the virtual thread number 3 is completed, the thread of the virtual thread number 4 is executed As set forth with respect to FIG. 3, the shown embodiment controls the threads 210 to be executed on one processor 110 employing the virtual thread number so that the thread under execution may have the smaller virtual thread number 211 than those of the threads in the waiting state on the processor in question. With such execution method, by the demand to the program 250 as the first feature of the shown embodiment illustrated in FIG. 2, as far as the threads 210 to be executed on one processor is concerned, the threads 210 can be executed without causing failure of synchronization.

FIG. 4 is an explanatory illustration showing a life period of an activation record accompanied with each thread executed on one processor in the embodiment of FIG. 3, along the axis. As shown in FIG. 4, with the shown embodiment, reservation and release of the activation record is performed in the order of LIFO. Accordingly, in the shown embodiment, activation framing is performed by employing a stack. This is the fourth feature of the invention.

Figure 5:
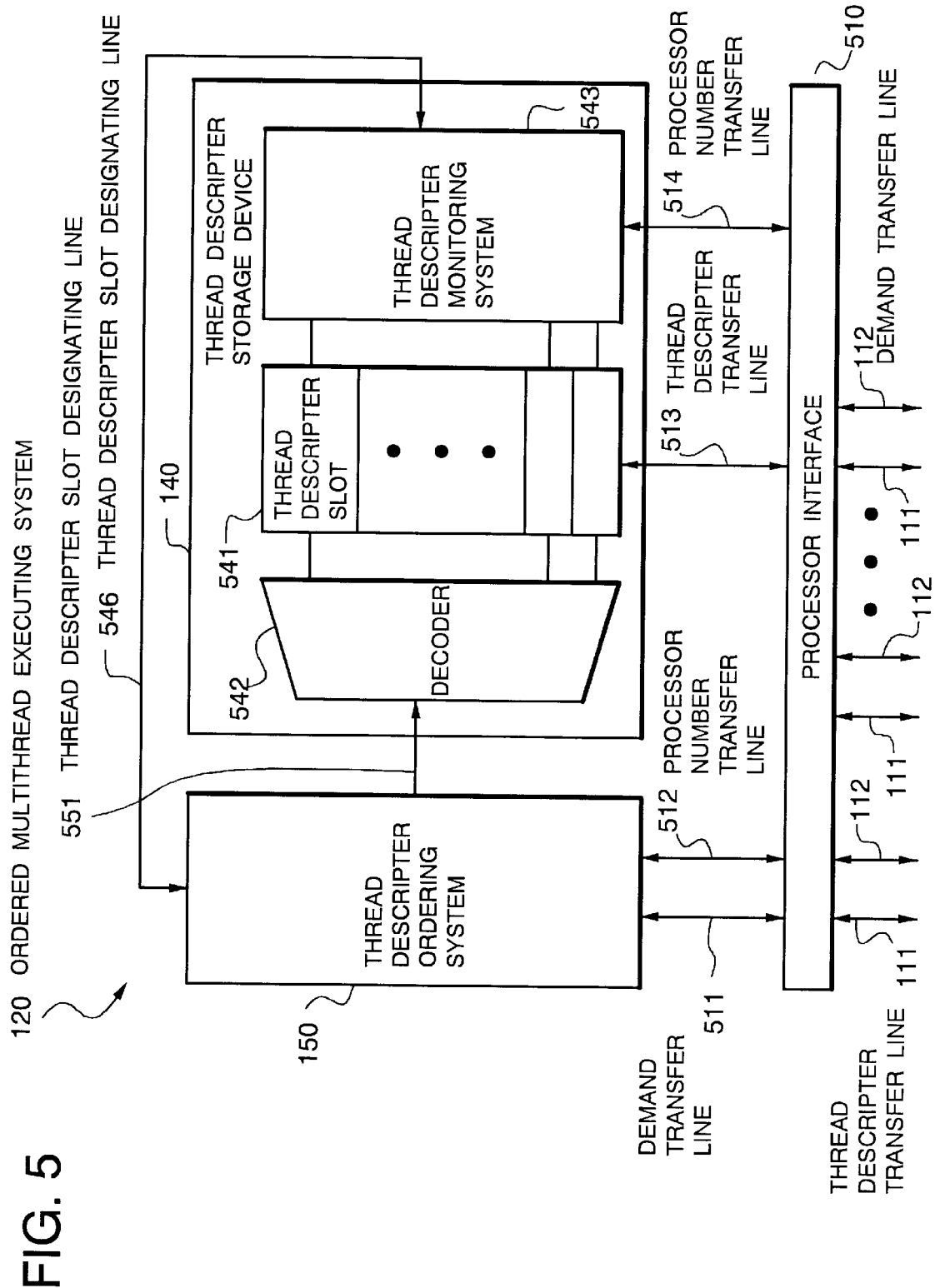
FIG. 5 is a block diagram showing a construction of an ordered multithread execution system of the shown embodiment.

FIG. 5 is a block diagram showing an internal construction of one embodiment of the ordered multithread executing system 120 in the embodiment of FIG. 1.

The ordered multithread executing system 120 is a system for realizing the ordered multithread execution method set forth above in the parallel processor system 100. In FIG. 5, the multithread executing system 120 is constructed with the thread descripter storage device 140, the thread descripter ordering system 150 and a processor interface 510. The thread descripter storage device 140 includes a plurality of thread descripter slots 541, decoders 542 and a thread descripter monitoring device 543. The processor interface 510 is connected to respective processors 110 via thread descripter transfer lines 111 and the demand transfer lines 112, to the thread descripter storage device 140 via demand transfer lines 513 and the processor number transfer lines 514, and to the thread descripter ordering system 150 via demand transfer lines 511 and processor number transfer lines 512. On the other hand, the thread descripter monitoring devices 543 in the thread descripter ordering system 150 and the thread descripter storage device 140, are connected via a thread descripter slot designation line 546.

In FIG. 5, the first feature of the thread descripter storage device 140 is a capability of storing the thread descripter 141 of the threads 210 in the executable state and the thread descripter 141 of the threads 210 in the waiting state, in the thread descripter slots 541. Here, the thread descripter 141 of the threads 210 in the waiting state includes address of the instruction to be used upon resumption of execution and the processor number of the processor 110 which executes the thread 210 in question.

The second feature of the thread descripter storage device 140 is that the a plurality of thread descripter 141 stored in the thread descripter slots 541 are maintained in alignment in one direction in the order of virtual thread number 211. Here, for convenience of disclosure, the thread descripter 141 having the smaller virtual thread number 211 is placed at the lower position in the thread descripter slot 541 as shown in FIG. 5. However, the order may be reversed. In the shown invention, irrespective of the upper side and lower side of the drawings, the direction of storage of the thread descripter 141 having smaller virtual thread number is referred to as the lower side.

By maintaining the thread descripters 141 in alignment in one direction within the thread descripter storage device 140, it becomes possible to realize the shown invention of the multithread execution method.

Figure 6:
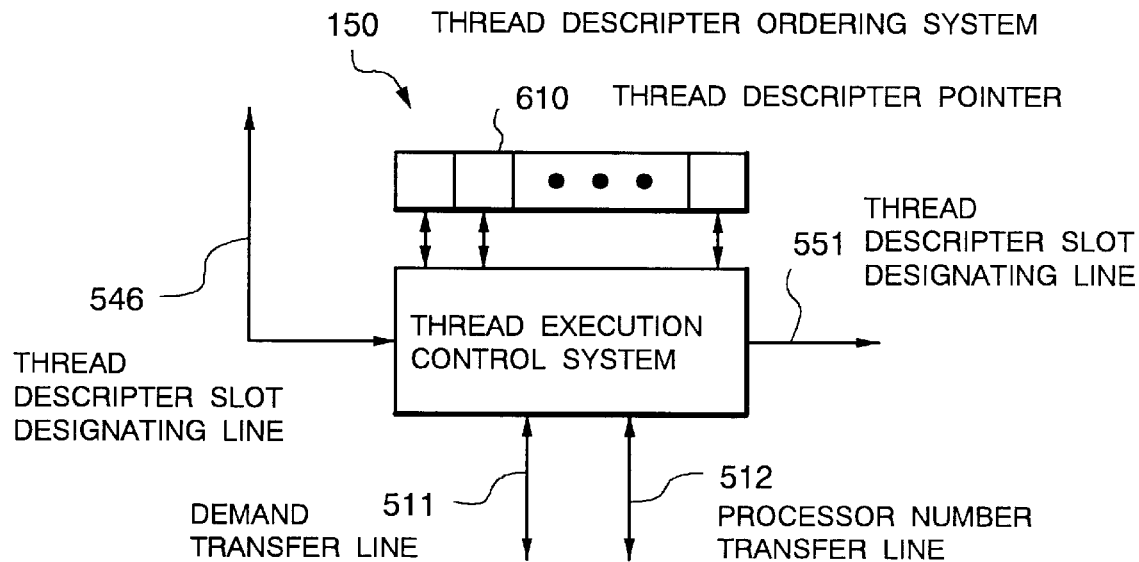
FIG. 6 is a block diagram showing a constriction of a thread descripter ordering system in the shown embodiment.

FIG. 6 is a block diagram showing a construction of the thread descripter ordering system 150 permitting the thread descripters 141 to be held in alignment according to the virtual thread number 211.

In FIG. 6, the thread descripter ordering system 150 comprises a thread descripter pointer 610 prepared for the number of processors 110 respectively corresponding to the processors 110, and a thread execution control system 610. Here, it is assumed that the value of the thread descripter pointer 610 corresponding to the certain processor 110 is n, where n is an integer from 0 to N–1, and N is a total number of the thread descripter slot 541. In this case, the value of the thread pointer 610 is smaller than the virtual thread number 211 of the thread descripter 141 in the (n)th thread descripter slots 541, and is greater than the virtual thread number 211 of the thread descripter 141 in the (n–1)th thread descripter slots 541. When the value of n is zero, it represents that the thread 210 in question has the smallest virtual thread number. When no thread descripter 141 is present in the (n)th thread descripter slots 541, it represents that the currently presenting thread 210 has the greatest virtual thread number 211 among the threads 210.

Thus, the thread descripter ordering system 150 constantly holds the large and small relationship of the virtual thread numbers 211 between the thread 210 currently executed on the arbitrary processor 110 and a plurality of thread descripter 141 stored in the thread descripter storage device 140. As will be discussed herebelow, by employing the ordered multithread executing system 120 and the thread descripter ordering system 150 provided in the former as shown in FIGS. 5 and 6, at the occurrence of the fork operation of the thread 210, when the thread 210 falls into the waiting state and when the execution of the thread is completed, the thread descripter 141 in the thread descripter storage device 140 is aligned according to the virtual thread number 211. Thus, the shown embodiment of the ordered multithread execution method can be realized.

Hereinafter, concrete discussion will be given for the shown embodiment of the control method.

With reference to FIGS. 5 and 6, discussion will be given for the embodiment of the control method of the ordered multithread execution system 120. At first, a fork demand is fed through the demand transfer line 511, and the processor 110 which outputs the fork demand is identified by the information through the processor number transfer line 512. Then, the thread execution control system 620 reads out all of the thread descripter pointers 610 and transfers the values of the descripter pointer 610 corresponding to the processor 110 feeding out the fork demand to the decoder 542 in the thread descripter storage device 140 via the thread descripter slot designating line 551. Here, the value of the thread descripter pointer 610 represents the thread descripter slot 541, to which the thread descripter 141 is to be inserted in accordance with the order of the virtual thread numbers 211. The thread descripter 141 is provided via a thread descripter transfer line 513 and inserted to the thread descripter slot 541 designated by the decoder 542. The thread descripter 141 is stored in the thread descripter slot 541 at the upper position than that in question. On the other hand, in the thread execution control system 620, values per se of the thread descripter pointer corresponding to the processor 110 which performs the fork operation and the value of the thread descripter pointers 610 having a virtual thread number greater than that of the thread in question are incremented by one. The results of addition are written in the thread descripter pointers 610.

Figure 7:
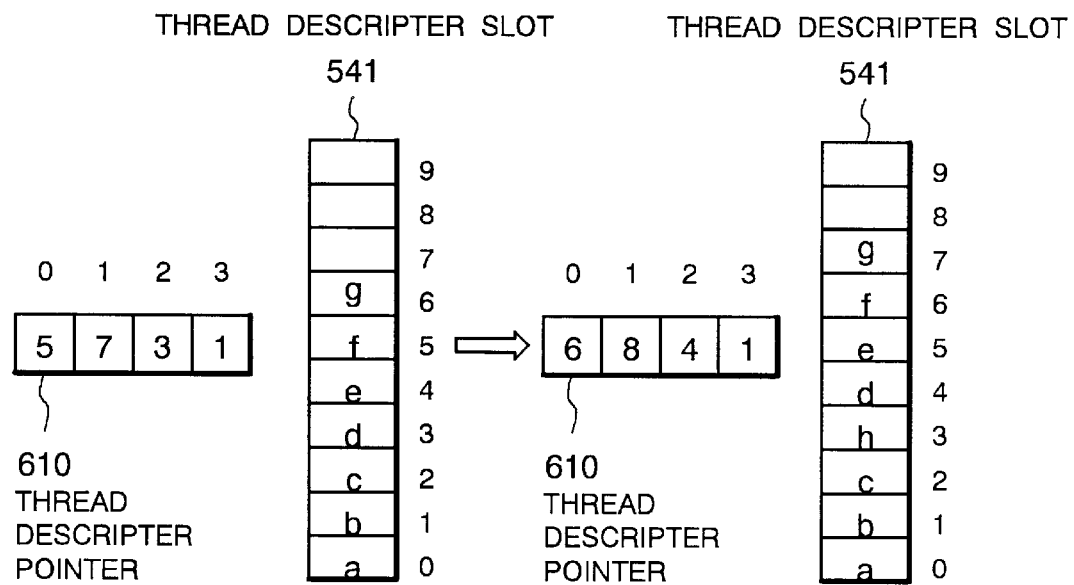
FIG. 7 is an illustration showing a fork operation by the shown embodiment of ordered multithread execution system.

FIG. 7 is an illustration to be used for discussion of the simplified example of the control method for the ordered multithread executing system 120 upon fork operation on the basis of the shown embodiment of the control method set forth above.

FIG. 7 illustrates an example where four processors 110 are employed and ten thread descripter slots 541 are provided and shows variation of the thread descripter slots 541 and the thread descripter pointers 610 at the occurrence of the fork operation. The value added above the thread descripter pointers 610 represent processor numbers and values added at the side of the thread descripter slots 541 are number thereof as counted from the lowermost one. Values in the thread descripter pointer 610 designate the number of the thread descripter slots 541 designated by the pointer, and alphabetic sign in the thread descripter slots 541 represent thread descripters 140 and different alphabetic sign represent the thread descripter 141.

Here, as shown in FIG. 7, assuming that the fork operation 201 is performed in the processor (2), the corresponding thread descripter 141 is inserted in the third thread descripter slot (3) according to the value of the thread descripter pointer (3) corresponding to the processor (2). By this, the thread descripters 141 are shifted up to the next upper positions, respectively. Here, the inserted thread descripter 141 is the thread descripter (h). On the other hand, as shown in FIG. 7, the thread descripter pointer of the processor (2) and the thread descripter pointers of the processors (0) and (1) are incremented by one. The reason why the value of the thread descripter pointer of the processor (2) is increased is that when the thread 210 is generated by the fork operation 201 of the thread 210 currently executed on the processor (2), the thread under execution should have one greater virtual thread number that the thread 210 generated by the fork operation 201. Thus, by the control method of the shown embodiment, when the fork operation is performed, the thread descripter 141 of the thread generated by the fork operation can be correctly aligned in the order of the virtual thread number in the thread descripter storage device 140.

Next, with reference to FIGS. 5 and 6, the control method is described in the case where the thread currently executed on a certain processor 110 enters into the waiting state.

In this case, the operation are separated into the following states.

At the first step, the thread descripter demand is transferred through the demand transfer line 511, and in conjunction therewith, the processor 110 which feeds out the thread descripter demand, is identified through the processor number transfer line 512. The thread execution control system 620 reads out all of the thread descripter pointers 610 and feeds the value of the thread descripter pointer 610 corresponding to the processor 110 which issued the thread descripter demand, to the thread descripter monitoring system 543 via the thread descripter slot designation line 546. The monitoring system 543 selects one of the thread descripter slots 541 positioned lower than the thread descripter slot 541 designated by the value of the thread descripter pointer 610 and having the thread descripter 141 in the executable state, and then returns the pointer to the selected thread descripter 141 via the thread descripter designating line 546. The selected thread descripter 141 is fed out via the thread descripter transfer line 513. Then, the storage content of the thread descripters 541 positioned in a higher position than the thread descripter slot 541 are shifted to one lower positions respectively. Here, the thread descripter pointer 610 with respect to the processor 110 which issued the thread descripter demand is re-written to the pointer to the thread descripter received from the thread descripter monitoring system 543 by the thread execution control system 620. On the other hand, the value of the thread descripter pointer 610 having greater values than the new thread descripter pointer thus obtained is subtracted by one by the thread execution control system 620, and written back to respective thread descripter pointers 610.

In a second step, the thread descripter 214 of the thread is fed out from the processor 110, in which the thread falls into the waiting state. The thread descripter 214 is inserted in the thread descripter slot 541 at the position one lower than the thread descripter slot 541 designated by the value of the older thread descripter pointer 610 for the processor 110 before rewritting in the first step. According to this, similarly to the control method in the case of the foregoing fork operation 201, the storage content of the thread descripter slot 541 at higher positions than the inserted thread descripter slot 541 is shifted to one upper position. Associated with this, the value of the thread descripter pointer 610 designating the thread descripter slots 541 positioned at higher position of the inserted thread descripter slots 541 is incremented by one.

Figure 8:
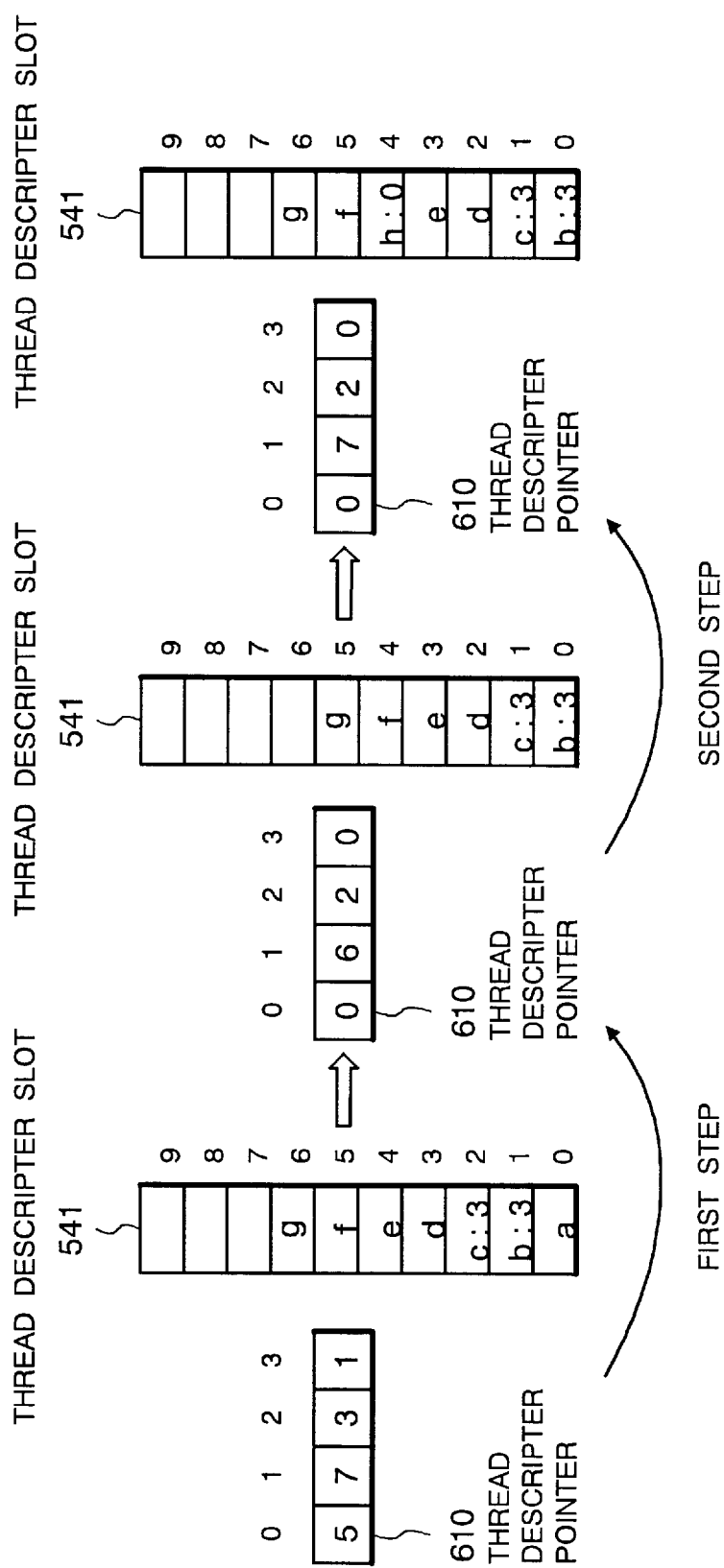
FIG. 8 is an illustration showing a control operation by the shown embodiment of the ordered multithread execution system, in the case where the thread becomes waiting state.

FIG. 8 is an explanatory illustration for explaining the control method of the ordered multithread executing system 120 in the condition where the thread executed on certain processor 110 falls into the waiting state, with the simple example and the similar manner to those of FIG. 7.

It should be noted that, in FIG. 8, the alphabetic sign representing the thread descripter 141 with a number represents that the colon followed by a thread descripter 141 corresponds to the thread in the waiting state in the processor 110 designated by the number. At first, the thread 210 executed on the processor (0) enters into the waiting state at a first step. According to the procedure set forth above, one of the thread descripters 141 which are stored in the thread descripter slots at the lower position than the thread descripter slot(5) and not in the waiting state on other processors, is selected. The selected thread descripter is fed out from the thread descripter storage device 140. Here, it is assumed that the thread descripter (a) stored in the thread descripter slot (0) is fed out. According to this, the storage content of the thread descripter slots 541 at higher position than the thread descripter slot (0) are shifted at one lower positions respectively. The value of the thread descripter pointer (5) with respect to the processor (0) is re-written by the value of the thread descripter slot 541 stored the fed out thread descripter 141, namely to (0). Furthermore, values of the thread descripter pointers 610 greater than the rewritten thread descripter pointer (0) are decremented by one.

Subsequently, at the second step, the thread descripter (h:0) of the thread 210 in the waiting state is fed from the processor (0). This thread descripter 141 is stored in the thread descripter slot 541 at the one lower position than the older thread descripter pointer 610 of the processor (0). According to this, the storage content of the thread descripter slot 541 at higher position than the inserted thread descripter slot 541 are shifted to one upper positions respectively, and the values of the thread descripter pointers 610 designating the thread descripter threads at higher position than the thread descripter slot (4) are incremented by one.

Through the operation set forth above, when the thread under execution on the processor 110 enters into the waiting state, initiation of execution of the thread 210 having smaller virtual thread number than those of the threads in the waiting state can be guaranteed. Also, the thread descripter 141 of the thread entered into the waiting state is stored in the correct position in the thread descripter storage device 140 according to the virtual thread number 211 according to the shown embodiment of the control method. Here, when the processor 110 enters into the waiting state, when the thread descripter 141 to be fed out cannot be found in the first step of the foregoing method, the thread entering into the waiting state is maintained in the waiting state until the cause for placing the thread in the waiting state is resolved or the thread descripter 141 which can be fed out to the ordered multithread executing system 120 from another processor is generated by the fork operation 201.

Next, with reference to FIGS. 5 and 6, discussion will be given for the shown embodiment of the control method in the case where the thread under execution on certain processor is terminated. In this case, at first, a thread descripter demand is fed through the demand transfer line 511, and the processor 110 which outputs the thread descripter demand is identified by the information through the processor number transfer line 512. Then, the thread execution control system 620 reads out all of the thread descripter pointers 610. The thread descripter monitoring system 543 receives the number of the processor 110 which issued the thread descripter demand and retrieves the thread descripter slot 541 storing the lowermost thread descripter 141 among the thread descripters 141 of the threads in the waiting states on the processor 110 in question. Then, among the thread descripter 141 stored in the thread descripter slot 541 thus retrieved and the thread descripter slots at lower position than the former, the thread descripters 141 other than those corresponding to the threads in the waiting state on other processors 110 are retrieved. Then, one of the retrieved thread descripter 141 is selected to feed the pointer to the thread descripter slot 541 corresponding to the selected thread descripter 141 which is then fed through the thread descripter slot designation line 546. On the other hand, the selected thread descripter 141 is fed via the thread descripter transfer line 513.

The storage content of the thread descripter slot 541, from which the thread descripter 141 is fed out and the thread descripter slots at upper positions to the former are shifted down one position. Here, by the thread execution control system 620, the thread descripter pointer 610 for the processor 110 which issued the thread descripter demand is replaced with the pointer to the thread descripter slot received from the thread descripter monitoring system 543. On the other hand, values of the thread descripter pointers 610 having values greater than the value of the new thread descripter pointer 610 obtained by the thread execution control system 620 are decremented by one.

Figure 9:
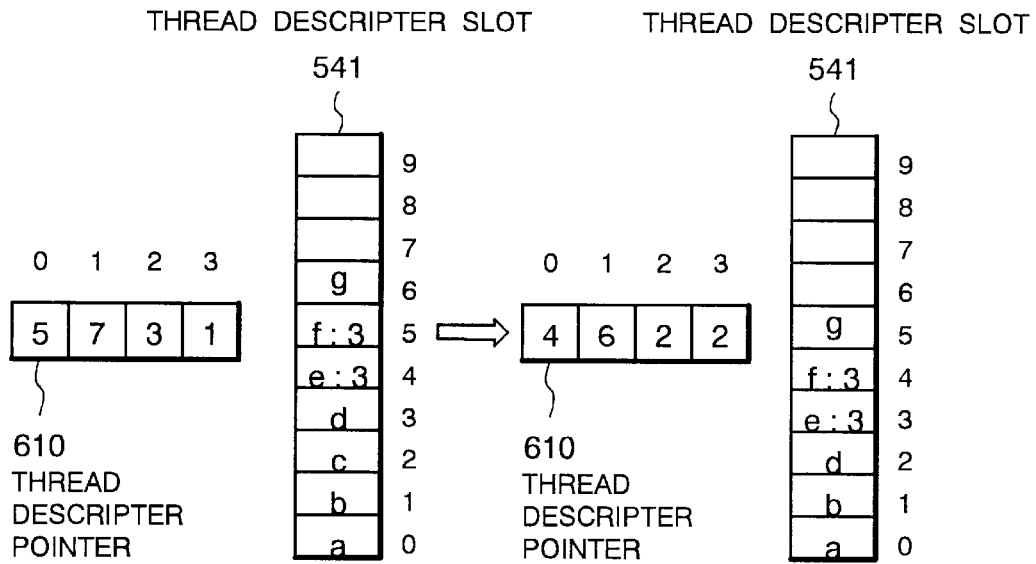
FIG. 9 is an illustration showing control operation by the shown embodiment of the ordered multithread executing system in the case where execution of the thread is terminated.

FIG. 9 is an illustration for explaining the control method of the ordered multithread executing system 120 upon termination of execution of the thread 210 by a certain processor on the basis of the control method discussed above, in the similarly simple example and similar manner to the control method of FIG. 8.

At first, the execution of the thread 210 is terminated in the processor (3). As discussed above, the thread descripter monitoring system 543 retrieves the thread descripter slot 541 storing the lowermost thread descripter 141 among the thread descripters 141 of the threads in the waiting states on the processor (3). Then, among the thread descripter 141 stored in the thread descripter slot 541 thus retrieved and the thread descripter slots at lower position than the former, the thread descripters 141 other than those corresponding to the threads in the waiting state on other processors 110 are retrieved. Then, one of the retrieved thread descripter 141 is selected to feed the pointer from the thread descripter storage device 140. In the shown case, the thread descripter (c) stored in the thread descripter slot (2) is selected and fed out. According to this, the storage content in the thread descripter slots 541 at higher than the thread descripter slot (2) are shifted down to one lower position respectively. The value of the thread descripter pointer 610 for the processor (3) is then replaced with the value of the thread descripter slot 541 contained the fed thread descripter 141, i.e. (2). Also, the values of the thread descripter pointers 610 greater than that of the thread descripter pointer corresponding to the selected thread descripter.

With the operation set forth above, it can be guaranteed that the thread is executed which has the smallest virtual thread number among the threads 210 in the waiting state in the processor in question. Here, when no thread descripter 141 in relation to the thread 210 is currently in execution, the thread descripter slot 541 which stores the thread descripter 141 at the highest position is retrieved and selected for execution, in place. On the other hand, when execution of the current executed thread 210 is completed or terminated and if no thread descripter 141 to be fed out is found in the method set forth above, the processor is held in the wait state until the thread descripter 141 which can be fed out, is formed to the ordered multithread executing system 120 from other processor 110.

As discussed above, when the thread 210 in execution enters into the waiting state on the processor 110, the thread descripter 141 is fed out from the thread descripter storage device 140 and upon re-writing the thread descripter slot 541, in which the thread descripter 141 fed out the thread descripter pointer 610 for the processor 110, by feeding out the thread descripter 141 from the thread descripter storage device 140, it is possible that a plurality of thread descripter pointers 610 designate the same thread descripter slot 541. The example of such case has been illustrated in the explanatory illustration of the embodiment of FIGS. 8 and 9. When a plurality of thread descripter pointers 610 designate the same thread descripter slot 541, and if the fork operation 201 is performed in one of a plurality of processors in question, the value of the thread descripter pointer 610 cannot be set at a correct value using only by the embodiment of the control method of the ordered multithread executing system upon occurrence of fork operation 201. This is because, in practice, despite the fact that there is an order relationship according to the virtual thread numbers 211 in the thread 210 under execution on a plurality of processors 110, the thread descripter pointers 610 are pointing to the same thread descripter slot 541. Accordingly, in such case, it becomes necessary to correctly align the thread descripter 141 in the thread descripter storage device 140.

Figure 10:
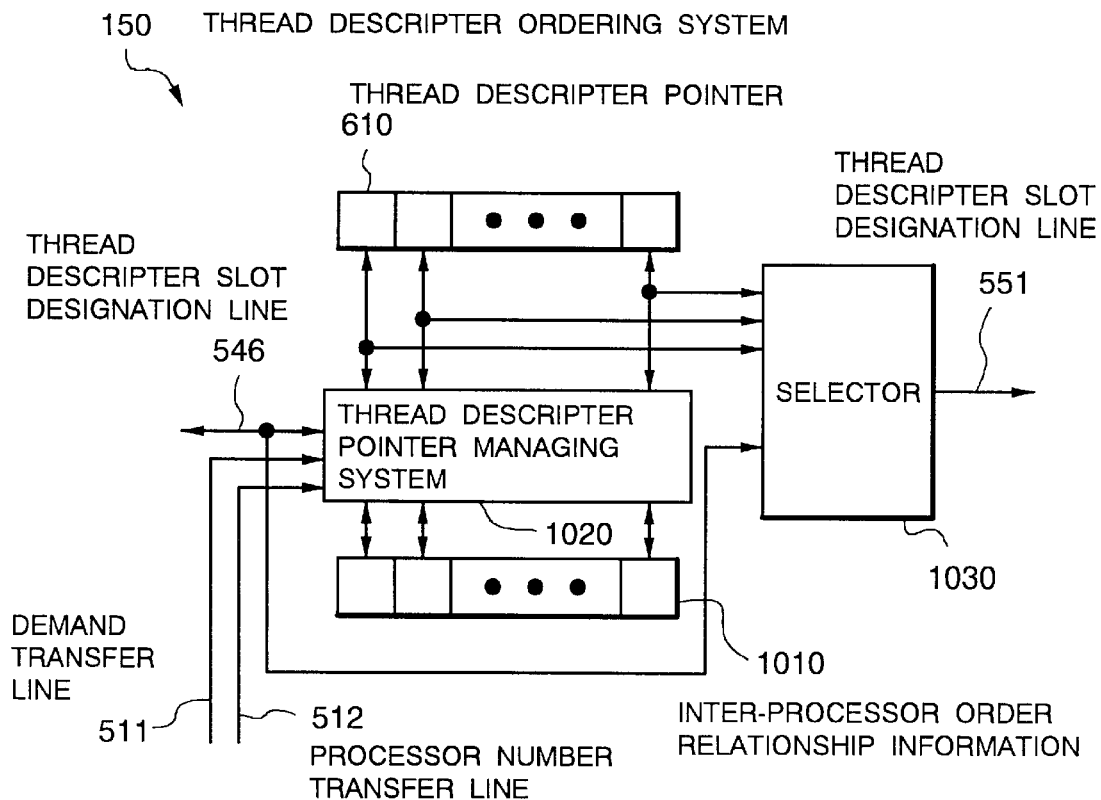
FIG. 10 is a block diagram showing a construction of the thread descripter ordering system in the ordered multithread executing system in the second embodiment of the parallel processor system according to the present invention.

FIG. 10 is a block diagram showing a construction of the thread descripter ordering system in the ordered multithread execution system 120 in the second embodiment of the parallel processor system according to the present invention.

According to the shown embodiment, the thread descripter 141 can be correctly aligned in the thread descripter storage device 140 according to the virtual thread number 211 even in the case set forth above.

In FIG. 10, the thread descripter ordering system 150 is constructed with the thread descripter pointers provided corresponding to the processors 110 in the number corresponding to the number of the processors 110, an inter-processor order relationship information 1010 provided for the number of processors 110, a thread descripter pointer managing system 1020 and a selector 1030. The activity of the thread descripter pointer 610 is the same as that in the embodiment of FIG. 6.

The selector 1030 serves for selecting one of pointers to the thread descripter slot 541 fed through a plurality of thread descripter pointers 610 together with and the thread descripter slot designation line 546 feeding to the decoder 542. When the thread descripter 141 is fed from the thread descripter slot 541, the pointer to the thread descripter slot 541 is fed to the thread descripter pointer managing system 1020 via the thread descripter slot designation line 546. Simultaneous comparison for discrimination between large and small of the value of the pointer and the values of the thread descripter pointers with respect to all of the processor 110 is performed for determining the inter-processor order relationship information 1010 on the basis of the resulting large and small relationship. Here, it is possible to have the case where the value of the pointer fed via the thread descripter slot designation line 546 is equal to the thread descripter pointer 610, and in this case, the value of the thread descripter pointer 610 is constantly regarded to be smaller.

The inter-processor order relationship information 1010 provides smaller value to the inter-processor order relationship information 1010 for the processor 110 in the smaller side in the comparison. Employing the inter-processor order relationship information 1010, which values of a plurality of thread descripter pointers 610 are the same, the thread descripter pointer 610 having the smaller value of the inter-processor order relationship information 1010 is regarded to be lower. Thus even in such case, the large and small relationship between the thread descripter pointers can be maintained.

Upon a fork operation 201 in the present invention, when the thread 210 falls into the waiting state, when the embodiment of the ordered multithread execution system upon termination of execution of the thread 210, and when the thread descripter pointers 610 have the same values, including the large and small relationship of the thread descripter pointers in the inter-processor order relationship information, upon thread descripter pointer 610 increments and decrements by one, by making judgement of the large and small relationship between the thread descripter pointers 610 including these large and small relationship, it becomes possible to perform correct ordering according to the virtual thread numbers 211.

In the control method of the ordered multithread executing system 120 upon fork operation 201 of the thread 210 according to the present invention, when there is a greater number of thread descripters 141 than the number of the thread descripter slots 541 in the thread descripter storage device 140, a problem is encountered concerning how to order the thread descripters 141 overflowing from the thread descripter storage device 140. Therefore, if the thread descripters 141 beyond the number of the thread descripter slots 541 in the thread descripter storage device 140 are forked from the processors 110, the threads corresponding to the thread descripters 141 are sequentially executed on the processor 110. Therefore, in FIG. 5, 6 or 10, at the occurrence of fork demand, the thread descripter ordering system 150 checks the value of the thread descripter pointers 610 and further checks whether the value of the maximum thread descripter pointer 610 is equal to the total number of the thread descripter slot 541. If the value of the maximum thread descripter pointer 610 is equal to the total number of the thread descripter slot 541 the thread descripter slots 541 stores all of the thread descripters 141. Then, upon a fork request the thread descripter ordering system 150 rejects the fork request of the processor 110. The processor 110 is responsive to the rejection to execute the thread by itself employing the forked thread descripter 141.

When the thread under execution on certain processor 110 enters into the waiting state or in the control of the ordered multithread executing system 1209 upon termination of execution, a plurality of thread descripters 141 which can be fed out, are present.

Figure 11:
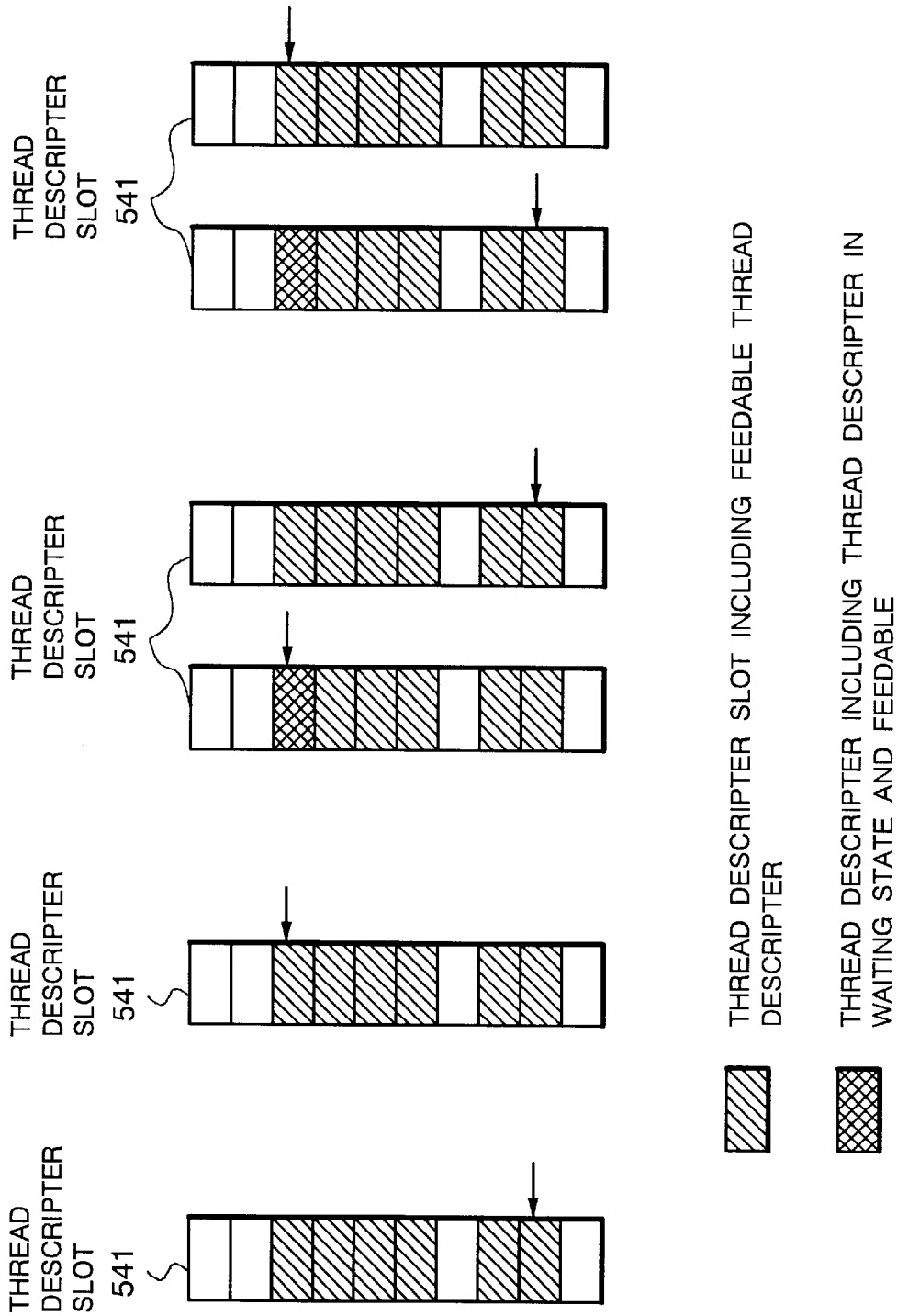
FIG. 11A is an illustration showing an operation for selecting one of a plurality of thread descripter which can be transmitted in the shown embodiment of the ordered multithread execution system.
FIG. 11B is an illustration showing an operation for selecting one of a plurality of thread descripter which can be transmitted in the shown embodiment of the ordered multithread execution system.
FIG. 11C is an illustration showing an operation for selecting one of a plurality of thread descripter which can be transmitted in the shown embodiment of the ordered multithread execution system.
FIG. 11D is an illustration showing an operation for selecting one of a plurality of thread descripter which can be transmitted in the shown embodiment of the ordered multithread execution system.

FIG. 11 is an illustration explaining four examples of the control method of the ordered multithread execution system for transmitting thread descripter 141 from a plurality of thread descripters.

FIGS. 11A to 11D show a plurality of thread descripter slots 541 in the thread descripter storage device 140. Amongst, the thread descripter slots 541, those thread descripters 141 which can be fed out are shown by hatched areas. Also, in FIGS. 11C and 11D, it is separately illustrated the case where the thread descripter 141 of the thread 210 in the waiting state is included in the thread descripters 141 to be fed out (shown cross hatched) and the case where the thread descripter 141 of the thread 210 are in the waiting state (shown hatched).

In FIG. 11A, it is featured to constantly select the lowermost one of the thread descripters 141 to be transmitted, namely the thread descripter having the smallest virtual thread number 211.

In the embodiment of the control method of the ordered multithread execution system in the present invention shown in FIG. 11B, the highest thread descripter 141 among the thread descripters 141 which can be fed out, is selected for execution namely the thread descripter having the largest virtual thread number 211.

In the embodiment of the control method of the ordered multithread execution system according to FIG. 11C invention, when the thread descripter 141 corresponding to the thread in the waiting state is included in the thread descripters to be fed out, the highest thread descripter, i.e. the one having the largest virtual thread number 211 is constantly selected for execution. In other cases, the lowest thread descripter, i.e. the one having the smallest virtual thread number 211 is constantly selected for execution. When the thread descripter 141 corresponding to the thread in the waiting state is present, such thread descripter 141 is always present at the uppermost position, the shown embodiment always feed out the thread descripter 141 corresponding to the thread in the waiting state, in the shown embodiment.

In the embodiment of the control method of the ordered multithread execution system according to FIG. 11D, when the thread descripter 141 corresponding to the thread in the waiting state is included in the thread descripters to be fed out, the lowest thread descripter, i.e. the one having the smallest virtual thread number 211 is constantly selected for execution. In other cases, the highest thread descripter, i.e. the one having the largest virtual thread number 211 is constantly selected for execution. When the thread descripter 141 corresponding to the thread in the waiting state is present, such thread descripter 141 is always present at the uppermost position, the shown embodiment always executes the thread descripter 141 corresponding to the thread in waiting state, is executed last, in the shown embodiment.

FIG. 12 is an illustration for explaining two separate embodiments of the control methods of the ordered multithread for selecting and feeding out one of the thread descripter among a plurality of thread descripters to be fed out. In FIG. 12, when the thread descripter is not included in the thread descripter slot 541, the thread descripter slot 541 is shown in blank, when the thread descripter 141 of the thread 210 in the waiting state is present, the thread descripter slot is shown by hatched area, and when the thread descripter 141 of the thread in the executable state, the thread descripter slop is shown with vertical hatching.

Here, the particular control method in the shown embodiment is to compare the number of the thread descripter slots of the thread descripters of the threads in the waiting state and the number of the thread descripter slots of the thread descripters of the threads in the executable state. A dynamic selection may be made of the thread descripters 141 contained in the thread descripter slots 541. In more concretely, if a large number of the thread descripters of the threads in the waiting state are included, the thread descripter 141 in the lowermost position shown in FIG. 11A is selected, and if a large number of the thread descripters 141 of the threads 210 in the executable state are included, the thread descripter 141 at the uppermost position is selected for execution.

Figure 13:
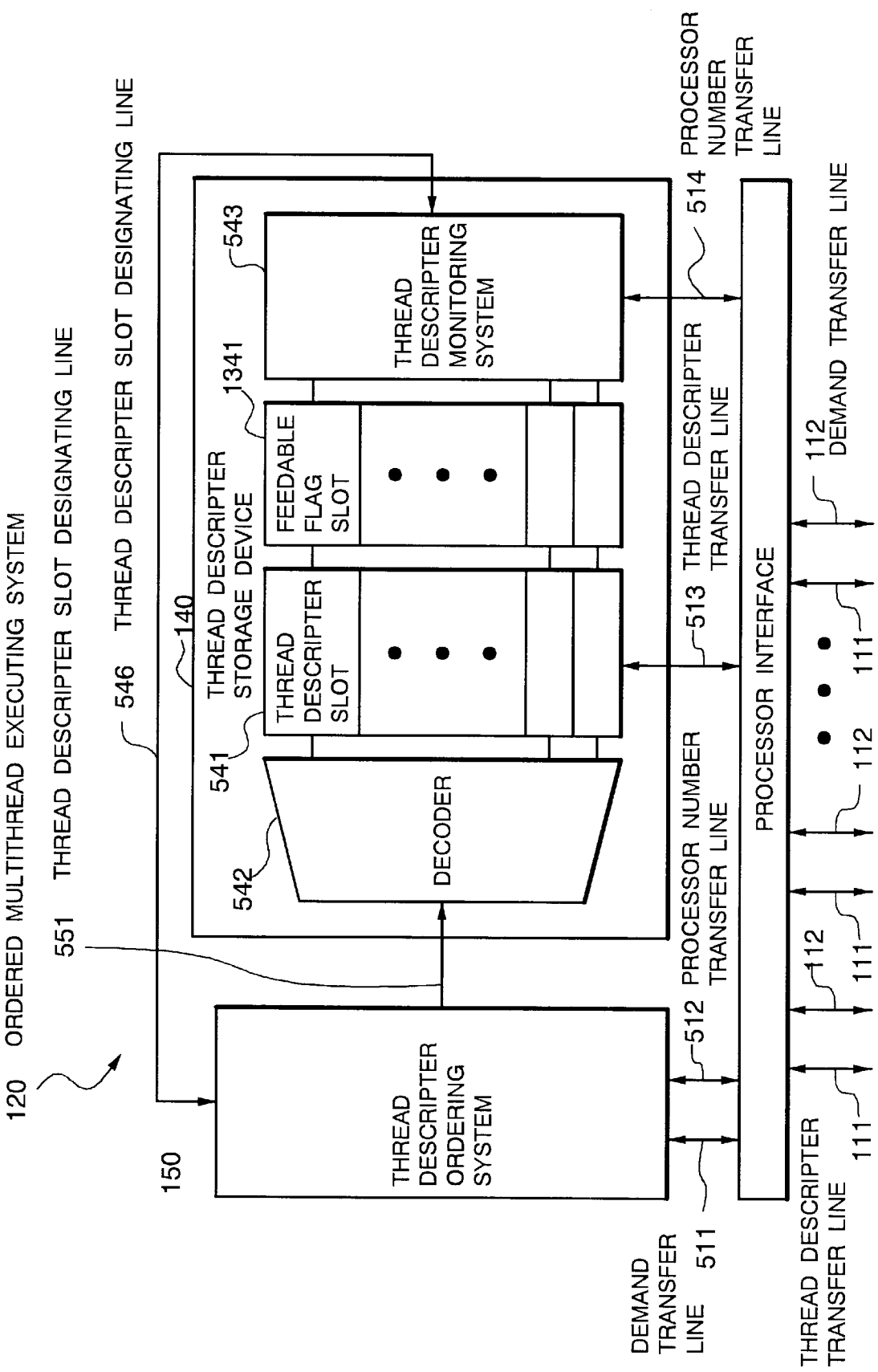
FIG. 13 is a block diagram showing a construction of the third embodiment of a parallel processor system according to the invention.

FIG. 13 is a block diagram showing a construction of the ordered multithread executing system 120 in the third embodiment of the parallel processor system according to the present invention.

In comparison with the first embodiment illustrated in FIG. 5, the shown embodiment is differentiated in that a feedable flag slot 1341 is added. The feedable flag slot 1341 is provided corresponding to respective thread descripter slots 541. Referring to FIGS. 11 and 12, in the shown embodiment, upon feeding the thread descripters 141 corresponding to the threads in the executable state and the waiting state, a plurality of thread descripters 141 to be fed out are present, and one of the thread descripters 141 is selected and fed out. In the shown embodiment, among the thread descripter 141 judged to be feedable in the method relating to FIGS. 8 and 9, the thread descripter 141 which can be fed out, is practically limited to only thread descripter 141, corresponding to which the feedable flag is set in the feedable flag slot 1341. Among the limited thread descripters 141, one is selected and fed out.

Figure 14:
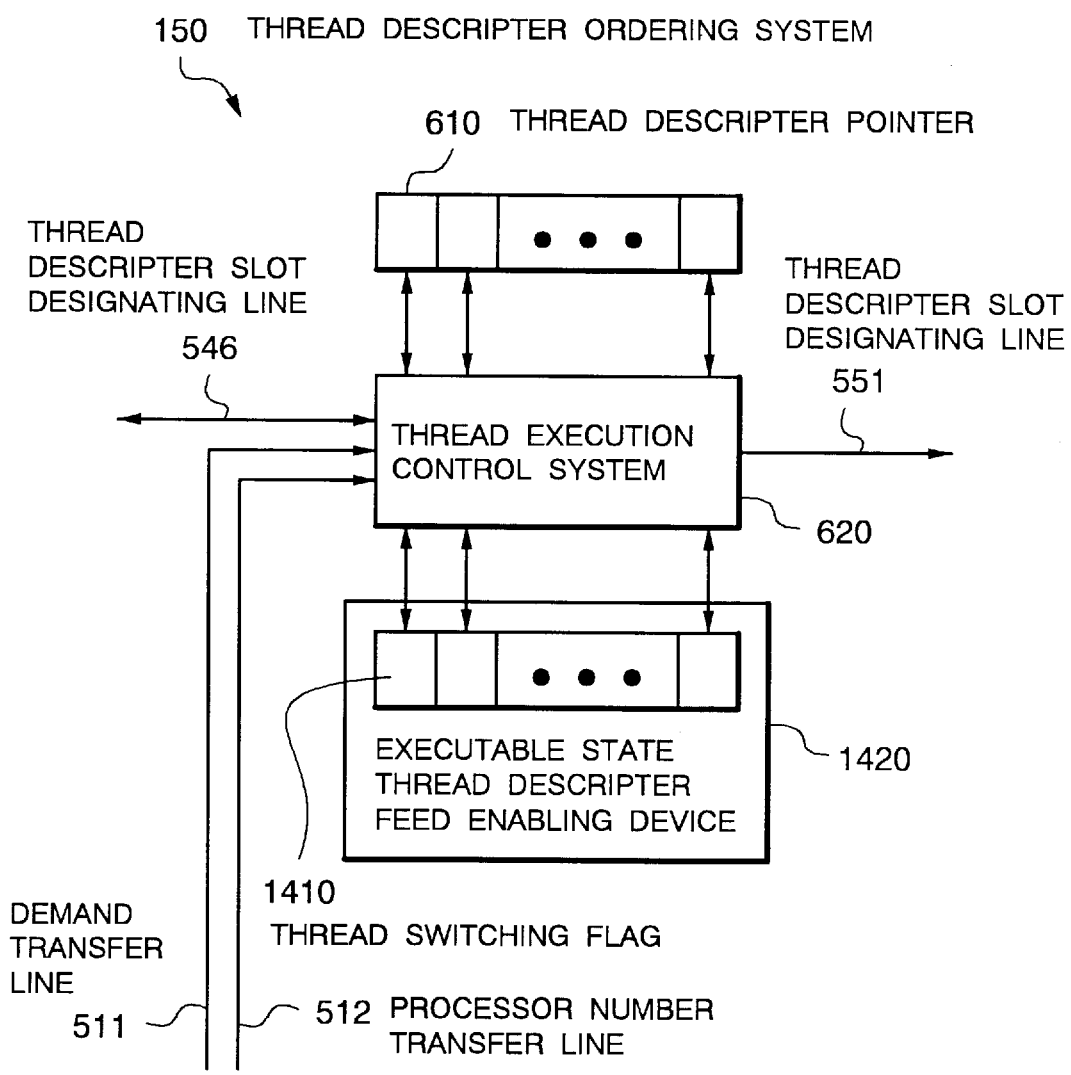
FIG. 14 is a block diagram showing a construction of the thread descripter ordering system of the third embodiment of the parallel processor system.

FIG. 14 is a block diagram showing the embodiment of the thread descripter ordering system 150 for setting the feedable flag slot 1341 relating the thread descripter 141 corresponding to the threads in the executable state.

The shown embodiment of the thread descripter ordering system 150 is constructed by adding an executable state thread descripter feed enabling system 1420 in addition to the construction of the embodiment of the thread descripter ordering system of FIG. 6. The executable state thread descripter feed enabling system 1420 serves for setting the feedable flag in the corresponding feedable flag slots 1341 only when the thread descripter 141 corresponds to the thread in the executable state is first forked from the thread with the thread descripter in question for the thread descripters of the executable threads stored in the thread descripter slots 541. It should be noted here "setting and resetting of the flag" does not mean that the flag is set or reset at the timing in the current execution.

In the embodiment of FIG. 14, the executable state thread descripter feed enabling system 1420 has a thread switching flag 1410 to perform the foregoing function. The thread switching flag 1410 is provided for each processor. The thread switching flag 1410 is set when the execution of the thread is initiated on the corresponding processor. Initiation of execution of the thread 210 includes the case where the execution of the thread is initiated when the executable thread descripter 141 or the thread descripter 141 indicative of the waiting state is fed from certain processor and the case where the execution of the threads is triggered sequentially.

Initiation of execution of the thread on certain processor is noticed to the thread execution control system 620 through the demand transfer line 511 and the processor number transfer line 512. According to this, the thread execution control system 620 sets the corresponding thread switching flag 141. Then, when the thread under execution on certain processor forks another thread, the thread switching flag 1410 corresponding to the objective processor is set. Occurrence of fork is noticed to the thread execution control system 620 via the demand transfer line 511 and the processor number transfer line 512. According to this the thread execution control system 620 resets the thread switching flag 1410.

At the occurrence of fork operation, by employing the thread switching flag 1410, the thread execution control system 620 performs control of the feedable flag slot 1341. Therefore, the thread descripter slot designation line 551 not only designates the thread descripter slot 541 but also includes designates the set or reset state of the feedable fag slot 1341. More concretely, upon occurrence of the fork operation, if the thread switching flag 1410 of the processor, on which fork is caused, is in the set state, the feedable fag is set in the feedable flag slot 1341.

Conversely, when the thread switching flag 1410 is in the reset state, the feedable flag of the feedable flag slot 1341 associated with the thread descripter slot 541 is reset.

Thus, when the thread descripter 141 is forked, the thread corresponding to the thread descripter 141 initiates execution. Then, the feedable flag is set only for the first forked thread 210.

On the other hand, when the thread descripter 141 indicative of the executable state of the corresponding thread is fed out, the storage content of the thread descripter slots 541 at upper positions relative to the thread descripter slot 541 stored the fed out thread descripter 141 are shifted down to one lower positions, respectively. Here, the storage content of the feedable flag slot 1341 associated with the thread descripter slots 541 at upper positions relative to the thread descripter slot 541 stored the fed out thread descripter 141 are shifted down to one lower position after automatically setting the feedable flag. By this, at the current timing, among the thread descripter 141 of the threads in the executable state stored in the thread descripter storage device 140 and forked from one thread, the feedable flag is set for the thread descripter forked at the earliest timing.

It should be noted that, in the shown embodiment, concerning the thread descripter 141 indicative of the waiting state of the corresponding thread is constantly set the feedable flag. Namely, when the thread descripter 141 representative of the waiting state of th corresponding thread 210 is inserted in the thread descripter slot 541, the feedable flag is set in the feedable flag slot 1341 corresponding thereto.

Figure 15:
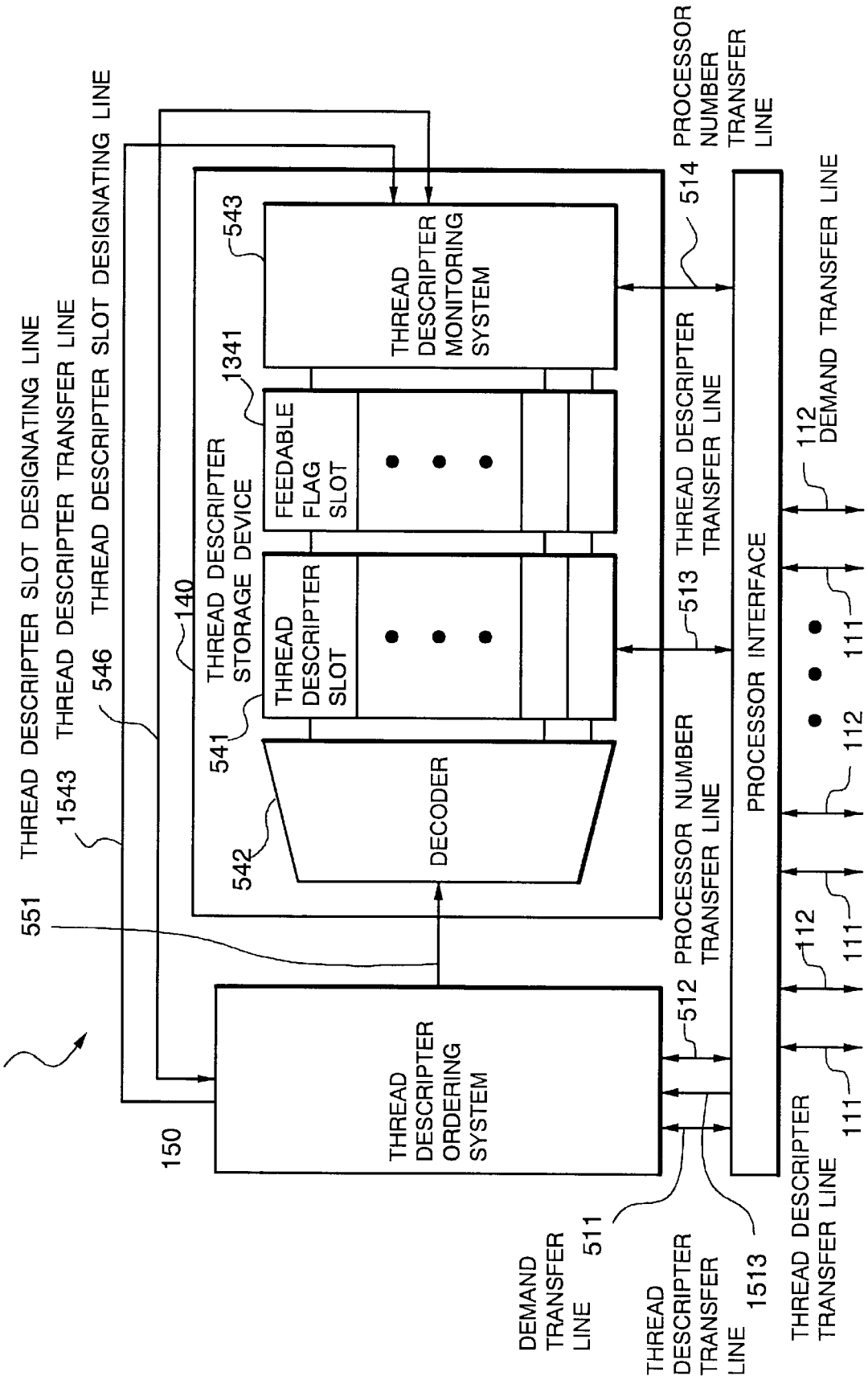
FIG. 15 is a block diagram showing a construction of the fourth embodiment of the parallel processor system according to the invention.

FIG. 15 is a block diagram showing a construction of the ordered multithread executing system 120 in the fourth embodiment of the parallel processor according to the present invention.

In comparison with the third embodiment shown in FIG. 13, the shown embodiment is differentiated in that the thread descripter ordering system 150 is connected to the processor interface 510 via a thread descripter transfer line 1513, and in that the thread descripter ordering system 150 and a thread descripter monitoring system 543 are connected via a thread descripter transfer line 1543. These new connections between the systems are required for setting the feedable flag depending upon the-condition whether synchronizing operation 202 was successful or not.

Figure 16:
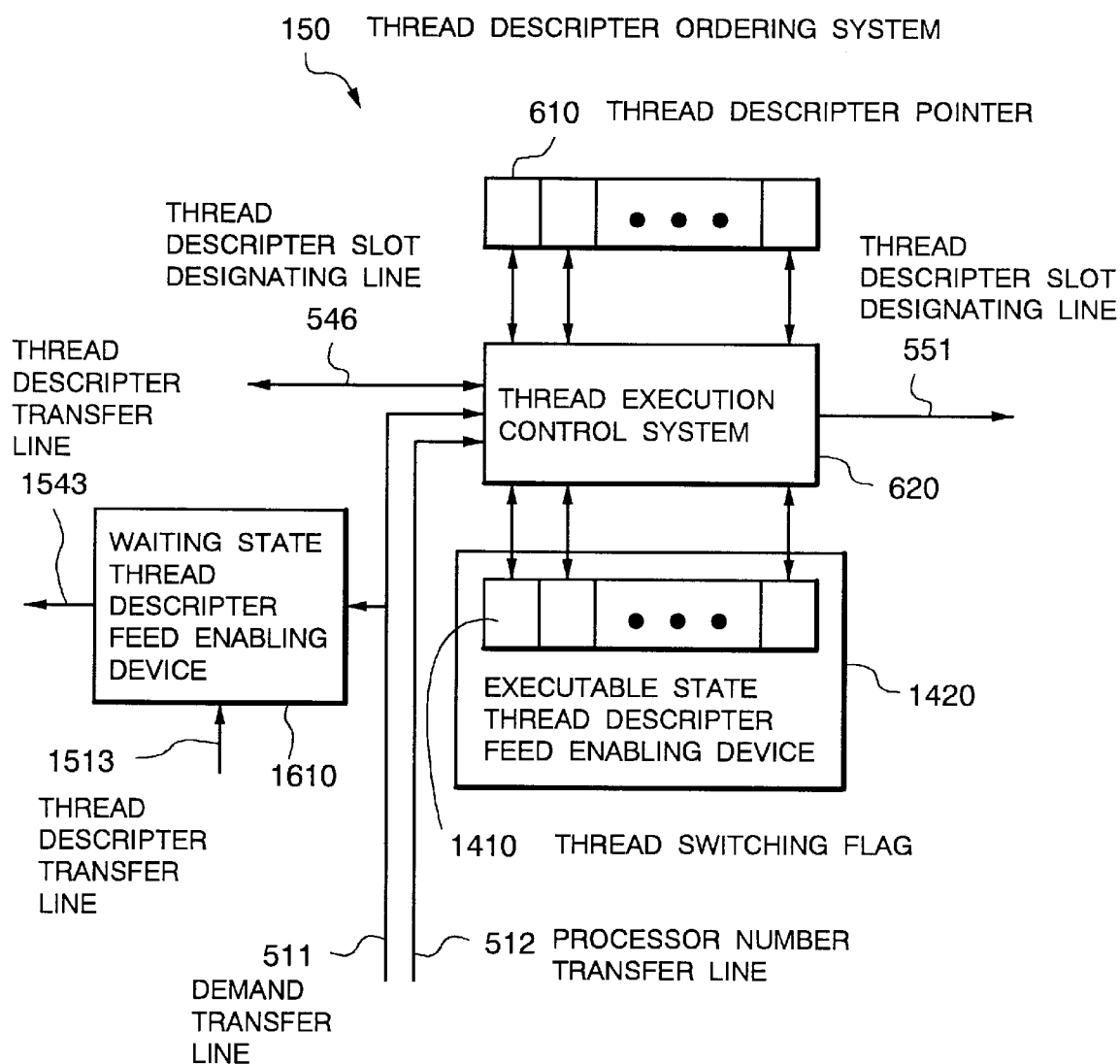
FIG. 16 is a block diagram showing a construction of the thread descripter ordering system of the fourth embodiment of the parallel processor system.

FIG. 16 shows a construction of the embodiment of th thread descripter ordering system 150 for setting of the feedable flag slot 1341 in the shown embodiment.

In FIG. 16, the thread descripter ordering system 150 has a waiting state thread descripter feed enabling system 1610, in addition to the construction of the former embodiment of FIG. 14. The thread descripter feed enabling system 1610 sets the feedable flag to the corresponding feedable flag slot 1341 only when the is successful. The synchronization condition 202 was the cause of falling into the waiting state for the thread descripter 141 with respect to the thread descripter 141 indicative of the waiting state of the corresponding thread in the thread descripter slot 541, is successful.

In FIG. 16, the waiting state thread descripter feed enabling system 1610 receives input through the demand transfer line 511 and the thread descripter transfer line 1513 and feeds out to the thread descripter transfer line 1543. The demand transfer line 511 notices the kind of operation of the synchronizing operation, address on the memory of the common parameter 220 to be synchronized to the thread descripter feed enabling system 1610.

In case of synchronized reading, when failure of synchronization is caused, the thread in execution falls into the waiting state, and the corresponding thread descripter 141 is stored in the thread descripter slot 541. A this time, the thread descripter feed enabling system 1610 stores the synchronization waiting address causing failure of synchronization noticed from the demand transfer line 511 and the thread descripter 141 indicative of the waiting state of the corresponding thread noticed through the thread descripter transfer line 1513 as a set.

When synchronized writing is performed, when the address of the designated common parameter is stored in the thread descripter feed enabling system 1610 as the synchronization waiting address, the thread descripter 141 indicative of the waiting state of the corresponding thread stored as a set of the synchronization waiting address is fed to the thread descripter monitoring system 543 via the thread descripter transfer line 1543. The thread descripter monitoring system 543 retrieves the thread descripter 141 corresponding thereto from the thread descripter slot 541 and set the feedable flag in the corresponding feedable flag slot 1341. By this, only the synchronized thread descripter 141 representative of the waiting state of the thread is made feedable.

FIG. 17 is a block diagram showing a concrete constriction of the thread descripter feed enabling system 1610 in FIG. 16.

The thread descripter feed enabling system 1610 comprises a synchronization buffer 1710, a comparator 1720, a register 1730 and a control device 1740. The synchronization buffer 1710 is constructed with a plurality of synchronization waiting address slots 1711 and a plurality of thread descripter slots 1712 and a plurality of effective flag slots 1713. As set forth above, the operation of the thread descripter feed enabling system 1610 takes the synchronization waiting address of the synchronization buffer 1710 as an access key and the thread descripter 141 as data. As generally well known, this can be realized in the construction of a cache memory. In the embodiment of FIG. 17, there is illustrated an example where the synchronization buffer 1710 is constructed as a cache memory of a direct map. However, various construction, such as set associative or full associative construction, may also be employed,.as a matter of course.

In FIG. 17, a part of the address of the common parameter 220 for synchronizing operation 202 designated through the demand transfer line 511 is provided to the decoder 1714 to determine which slot has to be selected. Other portions of the address of the common parameter is respectively provided to the synchronization waiting address slot 1711 when failure is caused in synchronized reading and to the comparator 1720 when failure is caused in synchronized writing. Depending upon the control signal 1741, the type of synchronizing operation is provided in the control device 1740 for controlling the operation of the thread descripter feed enabling system 1610. The effective flag slots 1713 sets the effective flag only when the effective data is held.

In the case where failure of synchronization is caused in synchronized reading, the synchronization waiting address and the thread descripter 141 are stored in respective slots designated by the address, and the effective flag is set in the effective flag slots 1713. At this time, if the effective flag is already set, the thread descripter 141 stored in the thread descripter slot 1712 is get rid of the thread descripter slot 1712 and fed to the register 1730 and the thread descripter monitoring system 543 via the thread descripter transfer line 1543.

On the other hand, in case of synchronized writing, the synchronization waiting address and the thread descripter 141 respectively designated by th synchronization waiting address are read out to the comparator 1720 and the register 1730. Here, when the effective flag is set in the effective flag slots 1713, the synchronization waiting address provided buy the comparator 1720 and the read synchronization waiting address are compared to verify if the synchronization is established or not.

When the synchronization is successful, the effective flag of the effective flag slots 1713 is reset. In conjunction therewith, the thread descripter 141 is transferred to the thread descripter monitoring system 543 via the thread descripter transfer line 1543. On the other hand, when synchronization has failed, or when the effective flag is not set, any variation of the internal condition of the synchronization buffer 1710 is prohibited.

As set forth above, when the thread descripter 141 is transferred to the thread descripter monitoring system 543, including in the case where the thread descripter 141 is remove from the thread descripter slot 1712, thread descripter monitoring system 543 retrieves the corresponding thread descripter 141 from the thread descripter slot 541 and sets the feedable flag to the feedable flag slot 1341. Including the case where the thread descripter 141 is remove from the thread descripter slot 1712, the feedable flag is set. Thus, it becomes the similar to that when synchronization is established. With this, the thread descripter 141 is deleted from the synchronization buffer 1710, it becomes unnecessary to consider subsequent establishment of the synchronization to make the process simplified.

The method of setting the feedable flag according to the shown embodiment has been discussed. Concerning the feedable thread descripter 141 limited by the feedable flag, any one of those may be selected and fed out. In the present invention, the embodiment of the selection method is a method to feed out the uppermost thread among the feedable thread descripter 141 and a method for feeing the lowermost thread descripter 141.

It should be noted that, in the embodiment of the present invention set forth above, the thread descripter monitoring system 543 can be realized by providing comparators respectively for the thread descripter slots and comparing the input processor number and the thread descripter 141 with the processor number and the thread descripter 141 in parallel. In such construction, the thread descripter storage device 104 may generally have a construction of an associative memory or content addressable memory or so forth.

The foregoing are mere embodiments of the present invention and should not narrow the scope of the present invention.

The thread descripter storage device 140 shown in FIG. 5, is constructed such that the thread descripter slot 541 are physically arranged in alignment and the order based on the virtual thread numbers 211 of the thread descripters 141 stored in the thread descripter slot 541 are expressed by physical positional relationship. As other example of construction, it may be possible to connect the thread descripter slots 541 with pointers depending upon the relationship of the order between the stored thread descripters 141 to realize the similar function.

In the thread descripter ordering system shown in FIG. 6, the thread descripter slot 541 having the thread currently executed on each processor is stored directly by the thread descripter pointer 610.

As an example of another construction, it may be considered a construction, in which the thread descripter slot 541 lower than the shown embodiment is pointed by the thread descripter pointer 610. Alternatively, it is possible to make the thread descripter pointer 610 to represent the relative position to another thread descripter pointer 610 to express correspondence to the thread descripter slot 541 by addition.

In the control method of the ordered multithread executing system according to the present invention, upon a fork operation 201, when the thread 210 enters into the waiting state or when the thread execution is completed, if the finally obtained arrangement of the thread descripter 141 in the thread descripter slot 541 and the value of the thread descripter pointer 610 are the same, an arbitrary exchange can be done. For example, it is possible that the thread descripter 141 of the certain thread 210 represents the waiting state, i.e., the thread descripter 141 of the thread 210 falls into a waiting state and is stored in the thread descripter storage device, at first and then new thread descripter 141 is fed out.

The thread descripter ordering system in FIG. 10 includes the inter-processor order relationship information 1010 showing the relative order relationship between the processors. In place of this, it is possible to provide the values of the thread descripter pointer 610 in the corresponding value to the number of the processors 110 to express the order relationship information between the processors by the value of the thread descripter pointer per se.

On the other hand, in the third and fourth embodiments of the thread descripter ordering system 150 in FIGS. 14 and 16 are based on the first embodiment of the thread descripter ordering system 150 shown in FIG. 6, they may be constructed using the second embodiment of the thread descripter ordering system 150 shown in FIG. 10.

As set forth above, according to the present invention, the multithread execution method having smaller overhead in execution can be realized. Here, the reason why the overhead can be reduces is that the activation frame used by the thread can be managed by the stack. By this, similarly to the sequential execution method, inline static management having small overhead can be performed.

Also, the conventional multithread execution method employs a method to resume execution of the thread in the waiting state by using the removal of the cause of waiting state as trigger. In such an execution method, it is required to have a means for checking whether the cause of the waiting state is resolved or not and means for initiating execution of the thread in the waiting state on the basis of the result of such checking. Such a system generally makes for complicated hardware. In the ordered multithread execution method according to the present invention, the thread in the waiting state is re-executed by the ordered multithread executing system irrespective the whether or not the cause of the waiting state is resolved. Therefore, the hardware construction can be simplified.

The ordered multithread executing system according to the present invention manages all of the threads under execution on respective processors and thread descripters stored in the thread descripter storage device in the order of the sequential execution path, namely on the basis of the virtual thread number. In the basis of this manner of management, the ordered multithread execution method is realized. Here, as is clear from the description given hereabove, since the cost for hardware for managing the order relationship between the threads is low, the ordered multithread execution method according to the present invention can be realized quite efficiently.

Also, the control method according to the present invention features a limitation of the total number of threads at the storage capacity of the thread descripter storage device. This feature contributes to lowering the cost for the hardware and can reduce cost for management at the occurrence of overflow in the thread descripter storage device.

Furthermore, the selection method upon selecting one of the thread descripter from a plurality of feedable thread descripter in the control method of the present invention is quite simple and can be realized by simple construction of the hardware. In particular, by employing the feedable flag to make the one thread which is formed at the earliest timing, feedable with respect to the executable thread descripter, and the thread, upon which synchronization is established, feedable with respect to the waiting thread descripters, selection method the thread description can be made to be effective in processing the program. This is because of the reason set forth below.

1) Among threads formed from the same thread, it is efficient to initiate process from the thread forked at an earlier timing, since the sequential process in the sequential execution path is performed in the order of the fork.

2). Concerning the threads in the waiting state, with respect to threads on which synchronization is not established, it is wasteful to re-execute since it will cause synchronization failure again. By selectively executing the threads in the waiting state only when synchronization is established, a high efficiency can be realized.

The method of the shown embodiments of the present invention can approximately realize these functions with simple hardware construction to realize high efficiency. The meaning of "approximately" is as follows.

1) When the thread is once placed in the waiting state and then re-executed, consideration is not given as the whether the thread forks or not before entering into the waiting state. Accordingly, the thread forked at first after re-execution may set the feedable flag to made it feedable.

2) When the thread descripter is deleted from the synchronization buffer, despite of the fact that synchronization is established, the feedable flag is set to make a determination of feedable.

By these, when the feedable flag is set, the limiting range becomes wider than the conditions set forth above. However, this enables simplification of the hardware construction.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A parallel processor system having a Plurality of processors executing a program having a plurality of threads executable in parallel, comprising:

thread generating means for managing three thread states of: (1) an executing state, (2) an executable state and (3) a waiting state and generating other threads in the executable state by a fork operation from the threads in the executing state;

thread execution control means for executing a first thread in the executable state, executing a second thread in the executable state in place of said first thread when the first thread in the executing state enters into waiting state, and re-executing said first thread in the waiting state after termination of execution of said second thread;

said thread generating means generating virtual thread numbers on a sequential execution path, said virtual thread numbers defining an order of termination of threads in sequential execution of said program along the sequential execution path; and said thread execution control means controlling execution of said threads so that synchronization operations in said program are performed only in the direction from the thread having a smaller virtual thread number to the thread having a greater virtual thread number.

2. A parallel processor system as set forth in claim 1, wherein said thread generating means generates said sequential execution path with respect to said program by replacing the fork operations with sequential function call operations.

3. A parallel processor system as set forth in claim 1, wherein said thread execution control means controls the order of execution of the threads on the processors so that, with respect to any one processor, the virtual thread number of the thread in the executing state is smaller than the virtual thread number of all of said threads in the waiting state on said one processor.

4. A parallel processor system as set forth in claim 1, wherein said thread generating means manages an activation record region to be used by the thread by employing a stack.

5. A parallel processor system executing a program having a plurality of threads executed in parallel, comprising:

a plurality of processors;

thread generating means generating virtual thread numbers on a sequential execution path, said virtual thread numbers defining an order of termination of threads in sequential execution of said program along the sequential execution path;

thread descripter storage means common between said plurality of processors for arranging a plurality of thread descripter slots, each slot storing a thread descripter having information necessary for execution of said thread in said thread descripter slot;

said thread descripter storage means:

storing thread descripters of threads in an executable state and in a waiting state in said thread descripter slots, and storing said plurality of thread descripters in a linear order in accordance with the virtual thread numbers corresponding to respective threads.

6. A parallel processor system as set forth in claim 5, wherein the threads in an executing state in said processors further includes a thread descripter pointer managing means corresponding to a plurality of processors for storing thread descripter pointers indicative of corresponding thread descripter slot positions in said thread descripter storage means in the linear order by said virtual thread number.

7. A parallel processing system as set forth in claim 6, wherein said thread descripter storage means inserts the thread descripter corresponding to a new thread in the executable state into the thread descripter slot designated by the value of said thread descripter pointer.

8. A parallel processing system as set forth in claim 6, wherein said thread descripter storing means defines a plurality of feedable thread descripters in the executable state from among said thread descripters stored in said plurality of thread descripter slots storing thread descripters having smaller thread numbers than the thread descripter designated by the thread descripter pointer corresponding to a predetermined processor upon the thread executed in the predetermined processor entering into a waiting state, selects one of the feedable thread descripters and feeds said selected thread descripter to said processor, and the thread descripter of the thread in the waiting state being inserted in said thread descripter slot designated employing the value of the thread descripter pointer.

9. A parallel processing system as set forth in claim 6, wherein said thread descripter storage means defines a plurality of feedable thread descripters in the executable state from among said thread descripters stored in said plurality of thread descripter slots storing thread descripters having smaller thread numbers than the thread descripter designated by the thread descripter pointer corresponding to a predetermined processor upon the thread executed in the predetermined processor being terminated, and selects one of the feedable thread descripters and feeds said selected thread descripter to said predetermined processor.

10. A parallel processing system as set forth in claim 8, wherein when said thread executed on the predetermined processor enters in the waiting state, the feedable thread having the corresponding virtual threads number smallest among a plurality of feedable thread descripters upon feeding of the thread descripter designating the thread to be next executed by the processor.

11. A parallel processing system as set forth in claim 9, wherein when said thread executed on the predetermined processor is terminated, the feedable thread having the corresponding virtual threads number smallest among a plurality of feedable thread descripters upon feeding of the thread descripter designating the thread to be next executed by the processor.

12. A parallel processing system as set forth in claim 8, wherein when said thread executed on the predetermined processor enters in the waiting state, said thread descripter storage means selects the feedable thread having the corresponding virtual threads number largest among a plurality of feedable thread descripters upon feeding of the thread descripter designating the thread to be next executed by the processor.

13. A parallel processing system as set forth in claim 8, wherein when said thread executed on the predetermined processor enters in the waiting state, said thread descripter storage means selects the feedable thread having the corresponding virtual threads number largest among a plurality of feedable thread descripters upon feeding of the thread descripter designating the thread to be next executed by the processor.

14. A parallel processing system as set forth in claim 8, wherein when said thread executed on the predetermined processor enters in the waiting state, said thread descripter storage means selects the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters.

15. A parallel processing system as set forth in claim 9, wherein when said thread executed on the predetermined processor enters in the waiting state, said thread descripter storage means selects the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters.

16. A parallel processing system as set forth in claim 8, wherein when said thread executed on the predetermined processor enters in the waiting state, said thread descripter storage means selects the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters, and otherwise select the thread descripter corresponding the largest virtual thread number.

17. A parallel processing system as set forth in claim 9, wherein said thread executed on the predetermined processor is terminated, the feedable thread having the corresponding virtual threads number smallest among a plurality of feedable thread descripters upon feeding of the thread descripter designating the thread to be next executed by the processor, when the thread descripter of the thread in the waiting state is included in the plurality of feedable thread descripters, and otherwise select the thread descripter corresponding the largest virtual thread number.

18. A parallel processing system as set forth in claim 8, wherein said thread descripter storage means compares number of thread descripter with respect to the stored threads in the waiting state and number of thread descripters with respect to the threads in the executable state and dynamically determines which thread descripter is to be selected among a plurality of feedable thread descripters depending upon the comparison, when said thread executed on the predetermined processor enters in the waiting state and upon feeding of the thread descripter designating the thread to be next executed by the processor.

19. A parallel processing system as set forth in claim 8, wherein said thread descripter storage means compares the number of thread descripter with respect to the stored threads in the waiting state and the number of thread descripters with respect to the threads in the executable state and dynamically determines which thread descripter is to be selected among a plurality of feedable thread descripters depending upon the comparison, when said thread executed on the predetermined processor is terminated and upon feeding of the thread descripter designating the thread to be next executed by the processor.

20. A parallel processing system as set forth in claim 8, wherein said thread descripter storage means compares the number of thread descripter with respect to the stored threads in the waiting state and the number of thread descripters with respect to the threads in the executable state so that the thread descripter corresponding to the smallest virtual thread number is selected when the number of the thread descripter with respect to the threads in the waiting state is greater and the thread descripter corresponding to the largest virtual thread number is selected when the number of the thread descripter with respect to the threads in the executable state is greater, when said thread executed on the predetermined processor enters in the waiting state and upon feeding of the thread descripter designating the thread to be next executed by the processor.

21. A parallel processing system as set forth in claim 8, wherein said thread descripter storage means compares the number of thread descripter with respect to the stored threads in the waiting state and the number of thread descripters with respect to the threads in the executable state so that the thread descripter corresponding to the smallest virtual thread number is selected when the number of the thread descripter with respect to the threads in the waiting state is greater and the thread descripter corresponding to the largest virtual thread number is selected when the number of the thread descripter with respect to the threads in the executable state is greater, when said thread executed on the predetermined processor is terminated and upon feeding of the thread descripter designating the thread to be next executed by the processor.

22. A parallel processing system as set forth in claim 6, wherein said thread descripter pointer managing means stores an inter-processor order relationship information indicative of the order relationship based on relative large and small relationship of the virtual thread number between a plurality of threads in the executing state on the processors, with respect to a plurality of processors, and when the thread descripter pointers relating to a plurality of processors are designated to the same thread descripter thread, the order relationship based on the virtual thread number between said plurality of threads in executing state on said processors is judged employing said inter-processor order relationship information.

23. A parallel processing system as set forth in claim 6, wherein said thread descripter pointer managing means rejects a fork demand when a number of thread descripters beyond the number of the thread descripter slots are generated by the fork operation of the processors.

24. A parallel processing system as set forth in claim 6, wherein said thread descripter storage means includes feedback flag slots adding a condition whether the thread descripter stored associated with the thread descripter slots are feedable or not, and said thread descripter storage means makes a judgement that a plurality of the thread descripters in the executable state being feedable among a plurality the thread descripters stored in said plurality of thread descripter slots storing thread descripter smaller than the virtual thread numbers than the thread descripter slot designated by the thread descripter pointer corresponding to the processor when the thread executed on said processor falls into the waiting state, and makes a judgement that a plurality of the thread descripters in the executable state being feedable among a plurality the thread descripters stored in said plurality of thread descripter slots storing thread descripter smaller than the virtual thread numbers than the thread descripter slot designated by the thread descripter pointer corresponding to the processor when the thread executed on said processor is terminated, and limits only thread descripters stored in the thread descripter slots, on which said feedable flag is set, as feedable for selecting one of a plurality of thread descripters defined as feedable to feed to the processor.

25. A parallel processing system as set forth in claim 24, which further comprises feedable flag setting means for setting feedable flag for the feedable flag slot corresponding to the thread descripter forked at the earliest timing among the thread descripters in the executable state stored in said thread descripter storage means formed from one thread.

26. A parallel processing system as set forth in claim 25, wherein said feedable flag setting means stores thread switching flag corresponding to a plurality of processor, which thread switching flag is set only when thread in the executing state on the processor does not fork thread after initiation of execution.

27. A parallel processor system as set forth in claim 24, which further comprises a feeding flag setting means for setting feedable flag for the feedable flag slots corresponding to thread descripters in synchronization is established among the thread descripters in the waiting state stored in said thread descripter storage means.

28. A parallel processing system as set forth in claim 27, wherein said feedable flag setting means includes a synchronization buffer for storing the thread descripter in the waiting state on which synchronization is not established and a synchronization waiting address corresponding to the thread descripter in the waiting state, and said synchronization waiting address stored in said synchronization buffer is employed for inspection whether synchronization is established or not for the thread descripter in the waiting state for synchronized writing.

29. A parallel processing system as set forth in claim 24, wherein among the limited feedable thread descripter, the thread descripter of the maximum or minimum virtual address number is fed.

* * * * *